(12) United States Patent
Ishizaka et al.

(10) Patent No.: US 7,535,593 B2
(45) Date of Patent: May 19, 2009

(54) PRINTING APPARATUS, DATA PROCESSING METHOD FOR PRINTING APPARATUS, AND PRINTING SYSTEM

(75) Inventors: Nobuhiro Ishizaka, Kawasaki (JP); Souhei Tanaka, Kawasaki (JP); Masaaki Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 11/139,489

(22) Filed: May 31, 2005

(65) Prior Publication Data

US 2005/0275853 A1 Dec. 15, 2005

(30) Foreign Application Priority Data

Jun. 1, 2004 (JP) ............................. 2004-163752

(51) Int. Cl.
*G06F 15/00* (2006.01)
*B41J 2/085* (2006.01)
(52) U.S. Cl. ....................................... 358/1.16; 347/76
(58) Field of Classification Search ................ 358/1.16, 358/1.18, 1.1, 450, 1.15; 347/19, 43, 9, 37, 347/240; 235/462.01, 472.01, 494, 375; 400/61, 62, 63, 76; 399/27, 193
See application file for complete search history.

(56) References Cited

U.S. PATENT DOCUMENTS 5,771,050 A * 6/1998 Gielen ......................... 347/19

2003/0193536 A1 10/2003 Kuronuma et al.

FOREIGN PATENT DOCUMENTS

JP 2003-305895 10/2003

OTHER PUBLICATIONS

Note: U.S. counterpart patent document also cited (see text of IDS).

* cited by examiner

*Primary Examiner*—Saeid Ebrahimi Dehkordy
(74) *Attorney, Agent, or Firm*—Fitzpatrick, Cella, Harper & Scinto

(57) ABSTRACT

A serial type printing apparatus includes: a reception buffer that stores printing data of respective arrays of printing elements subjected to adjustment by a first unit concerning a relative position in a scanning direction among the respective arrays of printing elements and setting data including registration information by a second unit smaller than the first unit concerning the relative position in the scanning direction, the data being transmitted from a host apparatus connected to the printing apparatus; and a print buffer that stores printing data of the respective arrays of printing elements in association with printing positions in the scanning direction. The printing apparatus performs control to adjust storing locations of the printing data of the respective arrays of printing elements by the second unit on the basis of the registration information and store the printing data in the print buffer. Consequently, it is possible to reduce a buffer size of the printing apparatus and improve an actual printing speed from instruction of printing until the printing is actually started.

9 Claims, 21 Drawing Sheets

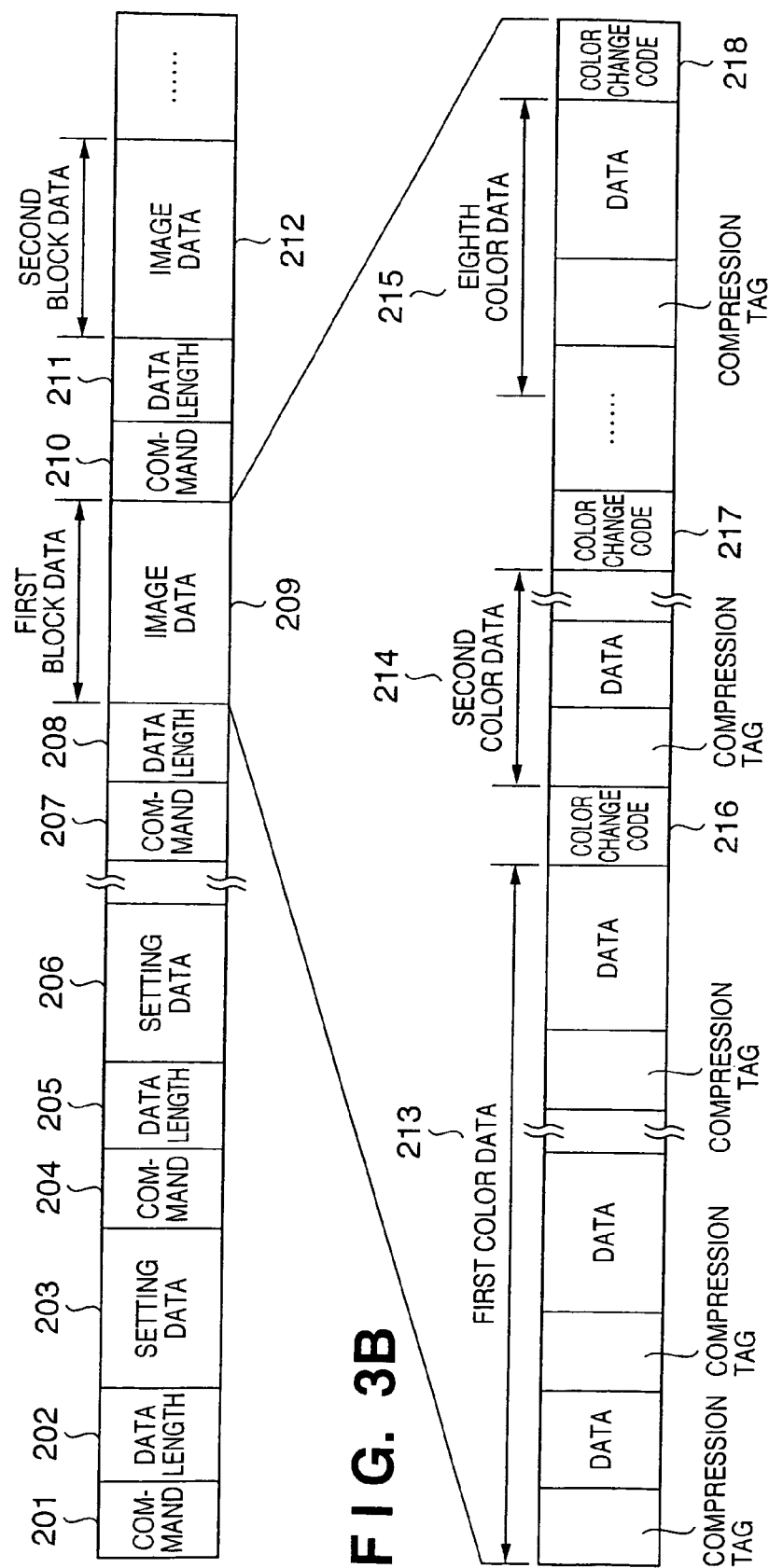

FIG. 4

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA | SECOND COLOR DATA | SECOND COLOR DATA | SECOND COLOR DATA |
| THIRD COLOR DATA | THIRD COLOR DATA | THIRD COLOR DATA | THIRD COLOR DATA | THIRD COLOR DATA | THIRD COLOR DATA | THIRD COLOR DATA | THIRD COLOR DATA |
| FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA |
| FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA |
| SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA |
| SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA |
| EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA |

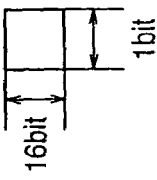

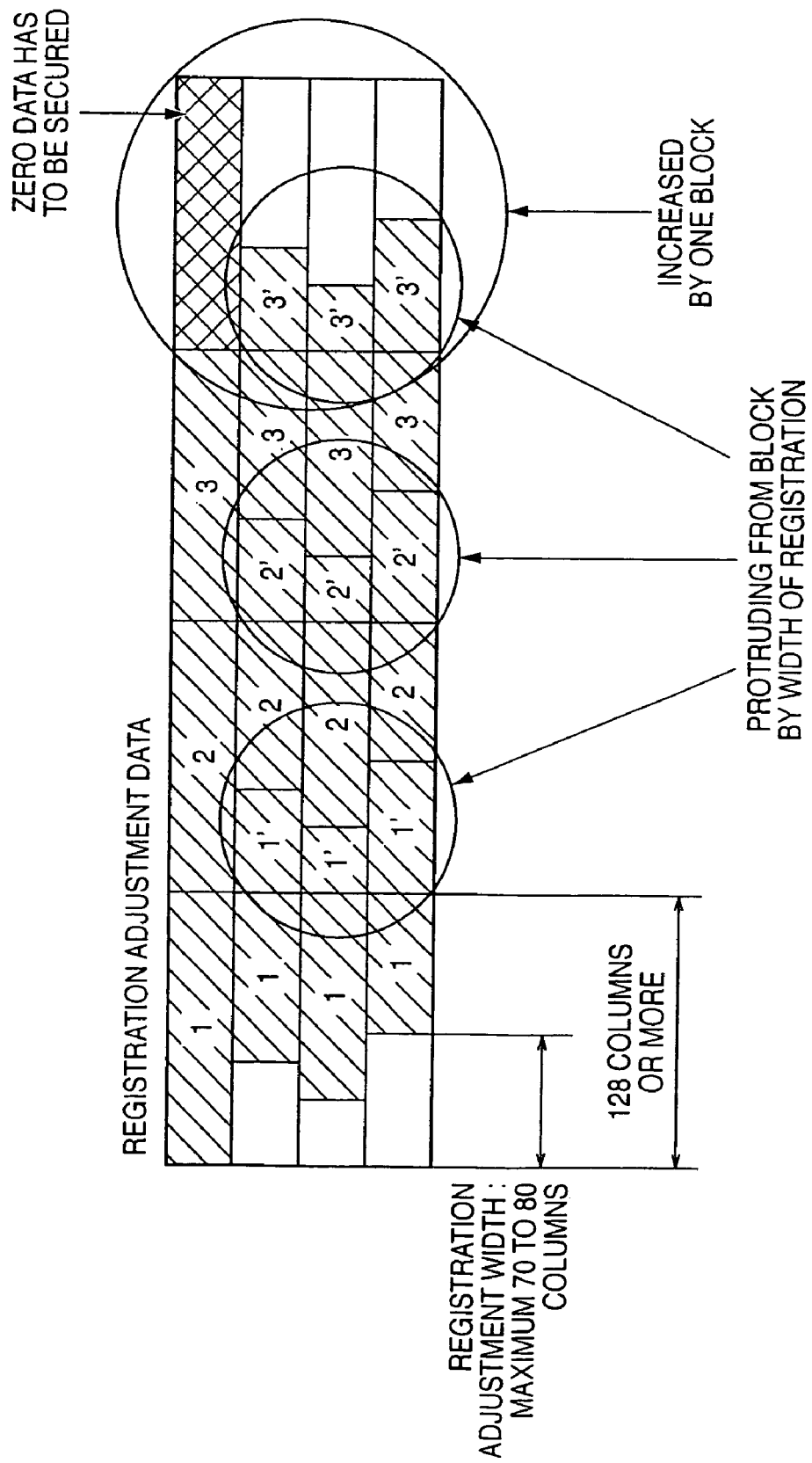

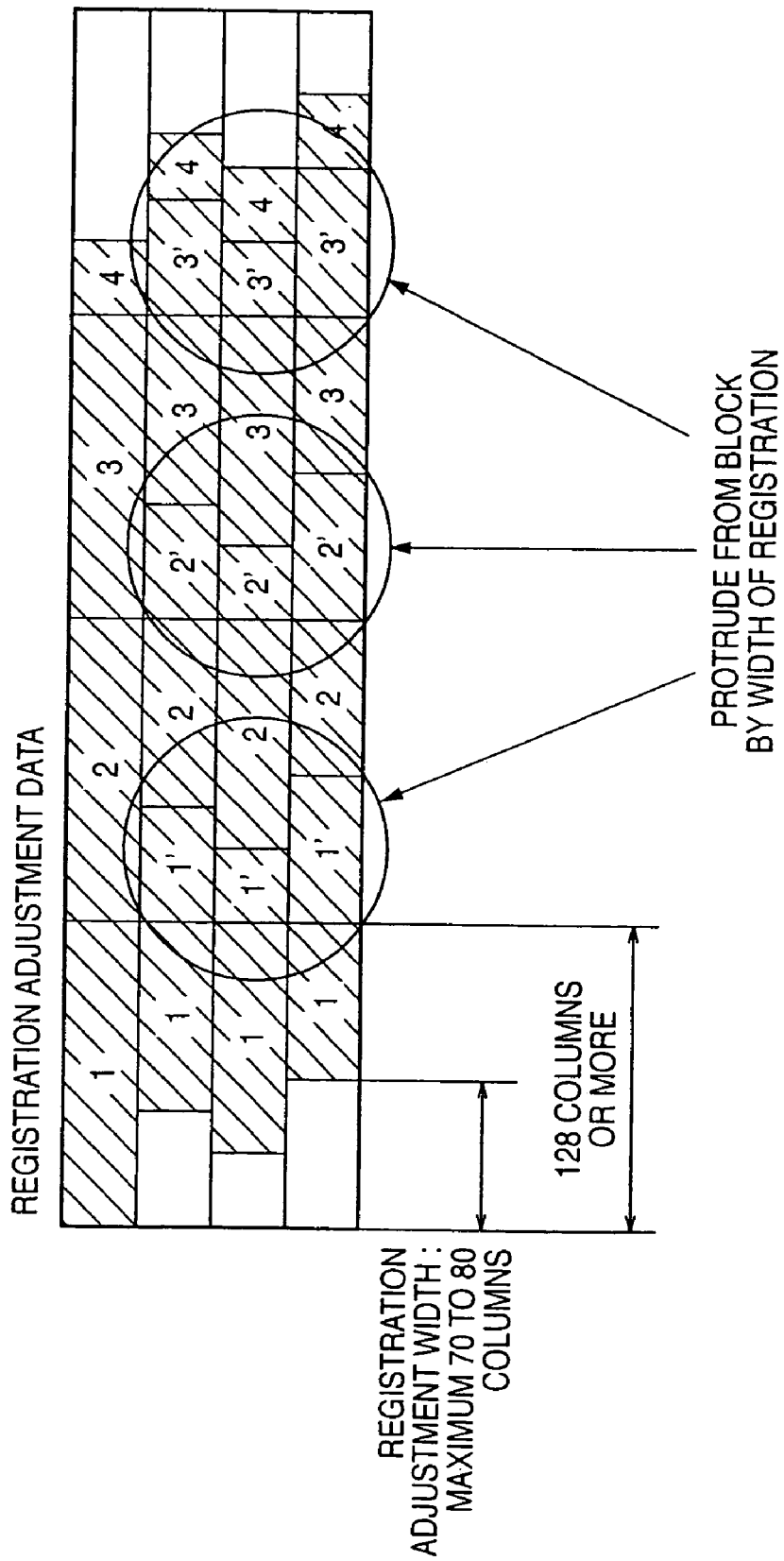

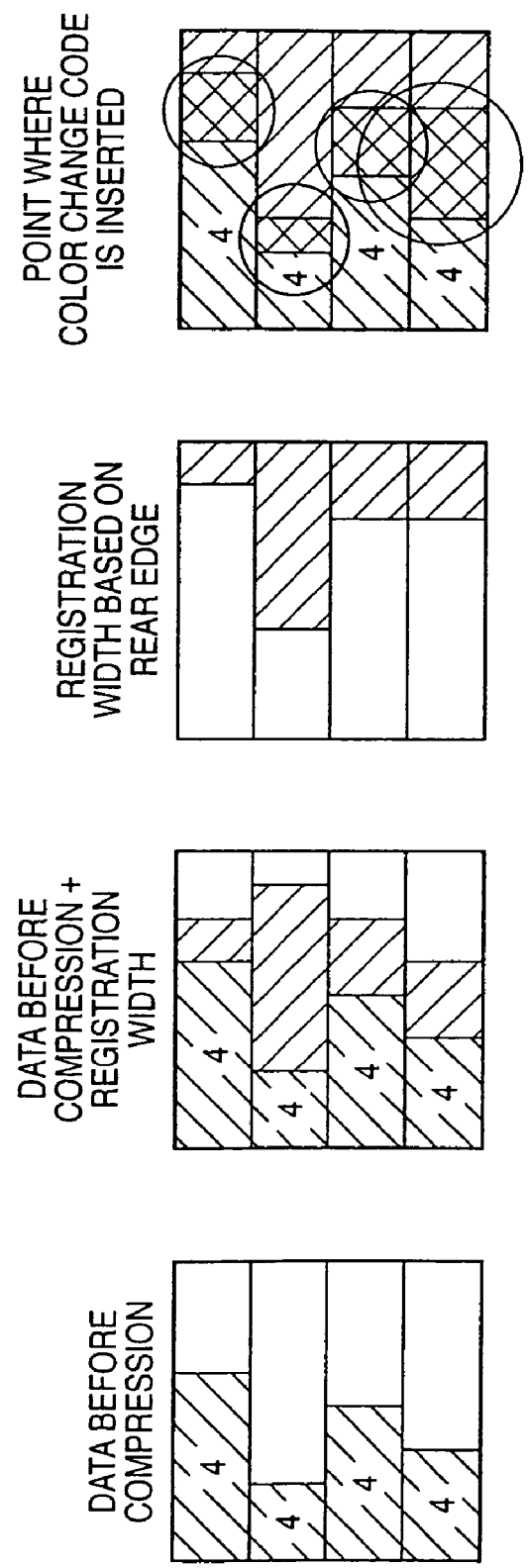

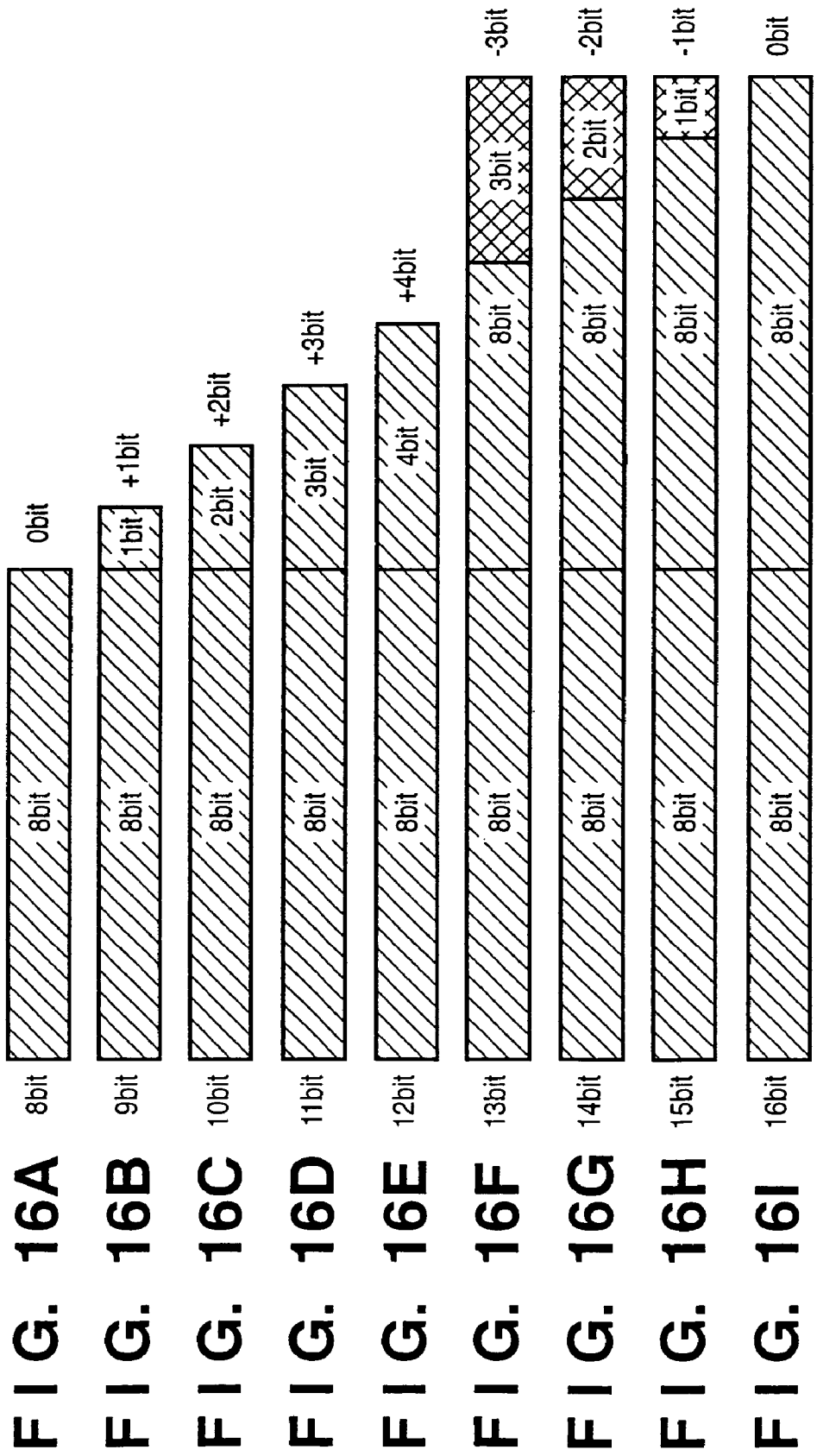

PRINTING APPARATUS, DATA PROCESSING METHOD FOR PRINTING APPARATUS, AND PRINTING SYSTEM

FIELD OF THE INVENTION

The present invention relates to a printing apparatus, a data processing method for the printing apparatus, and a printing system. More specifically, the invention relates to processing of printing data in a printing apparatus that performs printing by scanning a printhead having plural arrays of printing elements, in which plural printing elements are arranged in a predetermined direction, in a direction crossing the arrangement direction of the printing elements.

BACKGROUND OF THE INVENTION

As a data output apparatus of word processors, personal computers, facsimiles and so forth, printers capable of printing desired information such as texts and images on a sheet-type printing medium, e.g., paper, film and the like, are widely utilized.

Although various printing methods are available for such printers, recently an inkjet printing method has particularly attracted attention because of its capability to perform non-contact printing on a printing medium such as paper, ease of color printing, and low noise. Moreover, for a configuration of such a printer, in general a serial printing method is widely adopted because of its low cost and ease of downsizing. According to the serial printing method, a printhead discharging ink in accordance with desired printing data is attached to a carriage and printing is performed by reciprocally scanning the carriage in a direction crossing the conveyance direction of the printing medium (e.g., paper).

Conventionally, there is known a printing apparatus (a printer) that, in order to perform printing by scanning a carriage mounted with a printhead on a printing medium, divides a printing area in a scanning direction of the printhead into plural areas and has a buffer for storing printing data in units of the divided area.

Such a printing apparatus includes a write control unit that, in storing the printing data in units of the divided area in the buffer, controls write address information of printing data in units of area for each color data on the basis of information for switching a storing area of data for each color data, a result of comparison of a remaining buffer capacity available for storage and an updated amount of write addresses.

The printing apparatus also includes a read control unit that controls, for each color data, read address information for reading the printing data stored in the buffer and printing data generating means that generates printing data in units of the divided area in accordance with the printing data that is read on the basis of the read address information.

In the conventional printing apparatus constituted as described above, it is necessary to perform adjustment for a printing location in the scanning direction (registration adjustment) before actually performing printing. Such registration adjustment is executed on a host computer (a printer driver) side (Japanese Patent Application Laid-Open No. 2003-305895) or executed on the printing apparatus side.

Printing data transferred to the printing apparatus is generally represented by one bit (binary) for representing printing or non-printing. However, usually, a data processing unit of the host computer is set to 16 bits or 32 bits. Thus, it is inefficient to process data of one bit such as the printing data with the host computer and the processing takes time.

Therefore, when the registration adjustment is performed using the host computer (the printer driver), if an amount of printing data increases, the host computer takes time in generating printing data. As a result, an actual speed from instruction of printing until execution of the printing in the printing apparatus falls.

On the other hand, when the registration adjustment is performed using the printing apparatus, a buffer size corresponding to a width of the registration adjustment is always required. Thus, if the width of the registration adjustment increases, the buffer size required in the printing apparatus increases. As a result, cost for hardware increases.

SUMMARY OF THE INVENTION

It is an object of the invention to reduce time required for generation of printing data in a host computer and reduce a buffer capacity required for registration adjustment in a printing apparatus.

According to one aspect of the present invention, the above object is attained by a printing apparatus that performs printing by scanning a printhead having plural arrays of printing elements, in which plural printing elements are arranged in a predetermined direction, in a direction crossing the predetermined direction, comprising: a reception buffer that stores printing data of the respective arrays of printing elements subjected to adjustment by a first unit concerning a relative position in the scanning direction among the respective arrays of printing elements and setting data including registration information by a second unit smaller than the first unit concerning the relative position in the scanning direction, the data being transmitted from a host apparatus connected to the printing apparatus; a print buffer that stores printing data of the respective arrays of printing elements in association with printing positions in the scanning direction; and write control means that performs control to adjust storing locations (addresses for storing) of the printing data of the respective arrays of printing elements by the second unit on the basis of the registration information and store the printing data in the print buffer.

When the printing apparatus is constituted in this way, in the adjustment for the relative position in the scanning direction among the respective arrays of printing elements, the rough adjustment by the first unit is performed in the host apparatus and the adjustment by the second unit, smaller than the first unit, is performed in the printing apparatus. Therefore, compared with the case in which the adjustment for the relative position in the scanning direction among the respective arrays of printing elements is entirely performed in the host apparatus, it is possible to reduce time required for transferring printing data from the host apparatus. In addition, compared with the case in which the adjustment for the relative position in the scanning direction among the respective arrays of printing elements is entirely performed in the printing apparatus, it is possible to reduce a buffer size of the printing device.

Therefore, it is possible to improve an actual printing speed from instruction of printing until actual start of the printing without increasing cost of the printing apparatus.

The first unit may be a byte and the second unit may be a bit.

The printing apparatus may further comprise read control means that controls read address information for reading the printing data stored in the print buffer for each of the arrays of printing elements, and printing control means that performs printing by driving the respective arrays of printing elements in accordance with the printing data that is read on the basis of the read address information.

The printing apparatus may perform printing with different colors according to the respective arrays of printing elements.

A printing area in the scanning direction may be divided into plural blocks and the print buffer may store printing data for each of the blocks, and the write control means may have a register for storing information for distinguishing (identifying) presence or absence of data included in the printing data, a raster count of the data, and registration information of the data for each of the arrays of printing elements.

In this case, the write control means may control address information to be stored in the print buffer according to presence or absence of the printing data of the respective arrays of printing elements in the respective blocks.

The printing apparatus may perform printing by discharging ink from the respective printing elements.

Note that the above objects are also achieved by a data processing method corresponding to the above printing apparatus, a computer program which causes a computer to execute the method, or a storage medium which stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute as part of the specification, illustrate embodiments of the invention and, together with the description, serve to explain the principles of the invention.

FIGS. 3A and 3B are diagrams showing structures of data that are transferred from a host computer and stored in a reception buffer;

FIG. 4 is a diagram showing a data structure of a print buffer that holds printing data;

FIG. 9 is a diagram for explaining an actual address at the time when a registration adjustment value is not zero;

FIGS. 10A to 10C are diagrams schematically showing a state of data related to registration adjustment;

FIGS. 11A to 11C are diagrams schematically showing a state of data related to registration adjustment;

FIGS. 13A to 13D are diagrams showing a data structure of a final block according to the registration adjustment;

FIGS. 16A to 16I are diagrams for explaining allocation of data at the time when a registration adjustment value is 8 bits to 16 bits.

DETAILED DESCRIPTION OF THE PREFERRED EMBODIMENTS

Preferred embodiments of the present invention will now be described in detail in accordance with the accompanying drawings. Note that each elements in the following embodiments is not intended to limit the scope of the invention, but is described only as an example.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Further, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Moreover, "nozzle" should be interpreted as any combination of a discharge opening, a channel communicating thereto and an energy-generating element used for discharging ink, without annotation.

An embodiment, in which the invention is applied to an inkjet printing apparatus, will be hereinafter explained specifically.

[Schematic Structure of the Printing Apparatus]

Figure 1:
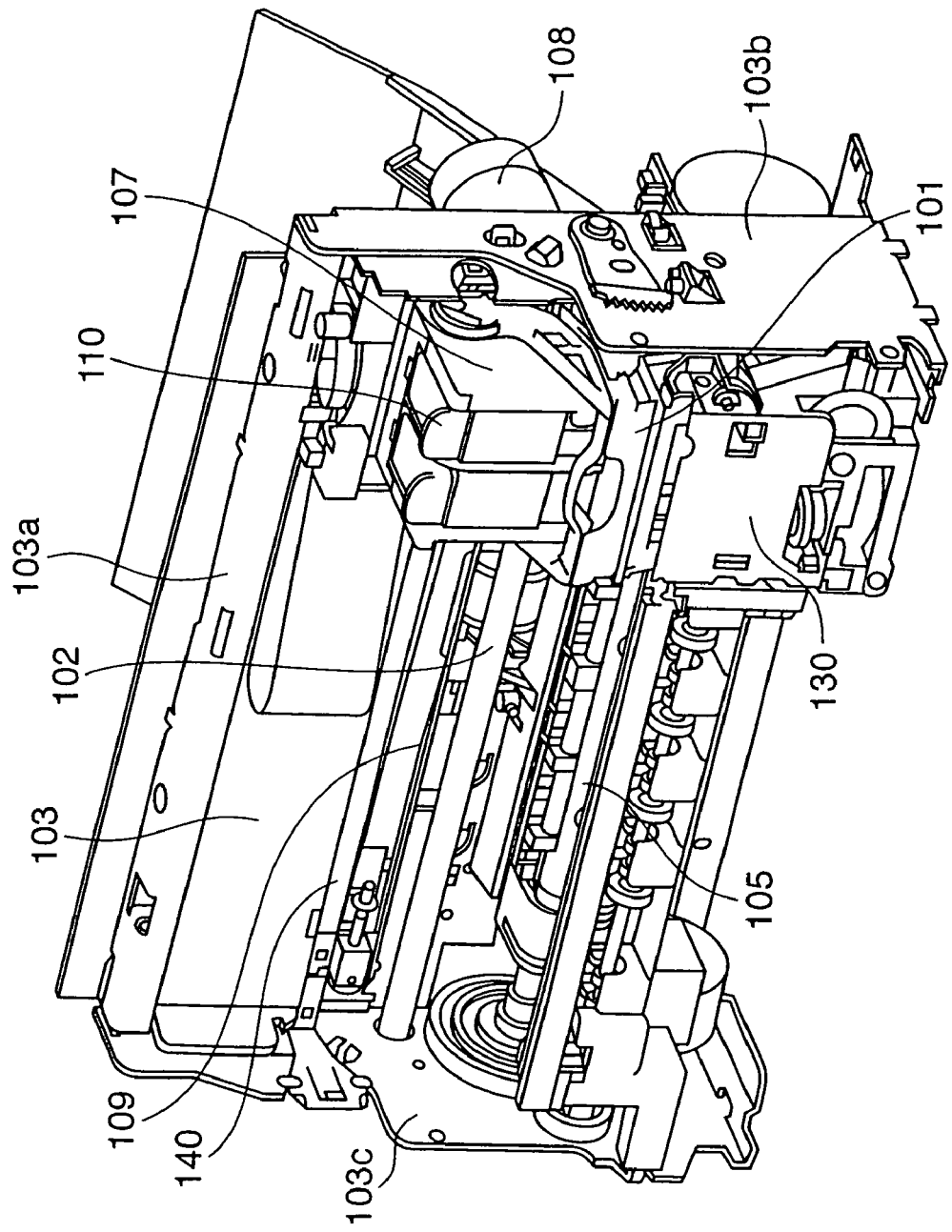
FIG. 1 is a perspective view showing an outer appearance of the construction of a printing apparatus in which a cover is taken off, according to the present invention.

FIG. 1 is a perspective view of the inkjet printing apparatus in this embodiment in a state in which a cover is removed.

In FIG. 1, a carriage 101 is mounted with a printhead (not shown) and cartridges 110 and is capable of traveling along a guide shaft 102. Note that, in this embodiment, the printhead is a printhead of an inkjet system. Reference numeral 103 denotes a chassis, which includes a main chassis 103a and left and right side plates 103b and 103c. Reference numeral 108 denotes a carriage motor serving as a drive source for the carriage; 109, a belt that is driven by a carriage motor 108 connected to the carriage; 130, a recovering system unit that performs cleaning and suction operations for a printhead discharge surface; and 140, a scale that constitutes a CR encoder for calculating a position and speed of a carriage in conjunction with a light-emitting element and a light-receiving element mounted on the carriage 101.

A printing sheet serving as a printing medium is delivered into an apparatus main body by a sheet feeding roller (not shown), nipped by a sheet delivery roller 105, a pinch roller (not shown), and a sheet pressing plate (not shown) and conveyed to a printing area of the printhead, and an image is printed on the printing sheet.

The ink cartridges 110 include two kinds of cartridges, a color ink cartridge containing inks of three colors, yellow, magenta, and cyan, and a black ink cartridge containing a black ink. The ink cartridges are inserted into cartridge guides 107 separately and connected to the printhead.

The inkjet printing apparatus in this embodiment is connected to a host computer and receives supply of printing data from the host computer (a printer driver) to perform printing. In order to scan the carriage mounted with the printhead on a printing medium to perform printing, the printing apparatus in this embodiment divides a printing area in a scanning direction of the printhead into plural areas and prints an image in units of the divided area.

In that case, in the inkjet printing apparatus in this embodiment, as described later, only adjustment of a printing data position (registration adjustment) in units of byte is performed on the host computer side and registration adjustment in units of bit is performed in a print buffer ring structure control circuit 8 on the printing apparatus side. Therefore, speed of generation of printing data in the host computer is increased, which makes it possible to realize an increase in an actual printing speed.

[Structure of a Printing Control Unit]

Figure 2:
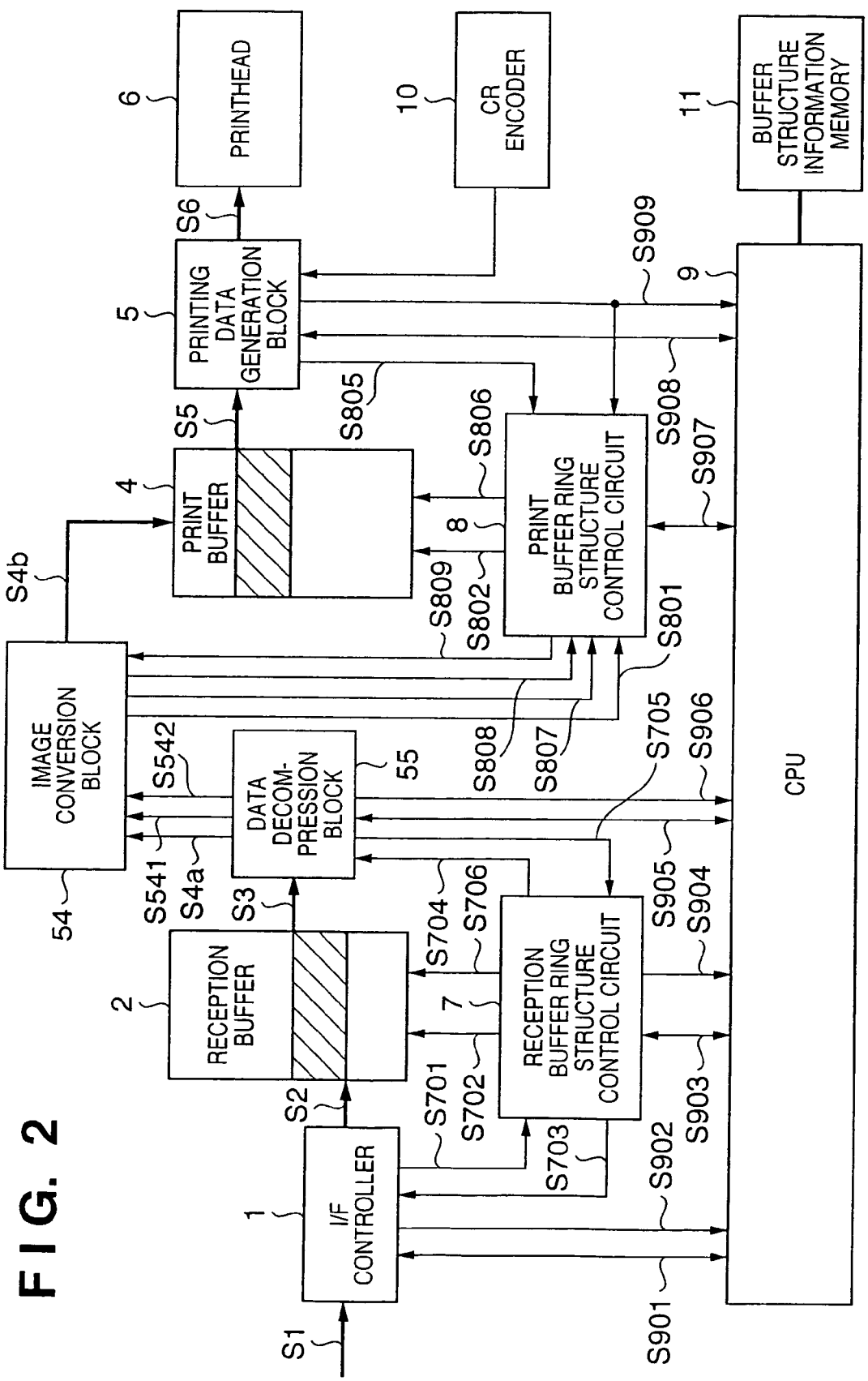
FIG. 2 is a block diagram showing an arrangement of a control circuit of the printing apparatus shown in FIG. 1.

FIG. 2 is a block diagram showing a structure of a printing control unit of the printing apparatus according to the invention. In the figure, reference numeral 1 denotes an interface control unit (a controller) that receives data transferred from the host computer (not shown) via an interface data line S1, extracts data necessary for operation of the printing apparatus and printing data out of the received data, and temporarily stores the data. The data extracted by the interface controller 1 are stored in a reception buffer 2 via a data line S2.

The reception buffer 2 is constituted by a memory device (a memory) such as an SRAM and a DRAM. Data to be stored in this reception buffer have structures as shown in FIGS. 3A and 3B.

As shown in a data structure of the reception buffer in FIG. 3A, data of "command" (201), "data length" (202), and "setting data" (203) are stored in order from the left. Subsequently, data of "command" (204), "data length" (205), and "setting data" (206) are stored. This indicates that data transferred in an order in time domain are stored in continuous addresses of the reception buffer. The setting data 206 described here is information indicating a setting for execution of sheet feed and an amount of sheet delivery, the number of printheads to be used, and the like. Printing in the printing apparatus is possible only when all pieces of information set by the setting data are collected. Thereafter, printing data (209, 212), which are objects of printing, are stored in the reception buffer 2.

The printing data (209, 212) are data obtained by dividing an amount of data, which is required when the printhead prints an image on a printing medium in one scanning, in units of block in a less amount of data. The printing data is sectioned by the unit of block and stored as first block data (209), second block data (212), and so on sequentially.

FIG. 3B is a diagram showing a data structure of the printing data divided by the unit of block in detail. As shown in the figure, data of plural colors (213 to 214) are stored as compressed data sequentially. The color data mean printing data corresponding to ink colors (cyan, yellow, magenta, and black) and are sectioned by "color change codes" (216, 217, and 218).

For example, when color data of four colors, cyan, yellow, magenta, and black, are assumed, if a printhead in which two nozzle rows, each including 64 nozzles vertically, are arranged in the scanning direction for each of the colors is used, data in units of each nozzle row constitutes one color data. Thus, data of four colors in each of the two nozzle rows, that is, compressed color data of first to eighth colors are stored in one block data as printing data. The respective nozzles of the nozzle rows are arranged in a conveying direction of the printing medium. For example, the first and the second colors are data of cyan, the third and the fourth colors are data of magenta, the fifth and the sixth colors are data of yellow, and the seventh and the eighth colors are data of black.

FIG. 4 is a diagram showing a data structure of a print buffer that holds printing data. For example, in printing a length in a scanning direction of maximum about 8 inches in one scanning, when it is assumed that one block data has a size that allows printing of about 1 inch in the scanning direction, if printing data of 8 blocks in total are printed, an image for one scanning is completed. First to eighth blocks are arranged in the scanning direction of the printhead and first color data to eighth color data are stored in respective block data. Lengths of the respective color data stored in the respective blocks correspond to the number of nozzles of the printhead.

Referring back to FIG. 2, the explanation of the respective control blocks is continued. "Command", "data length", and "setting data", which are setting values for controlling the printing apparatus, among data stored in the reception buffer 2 are read out from the interface controller 1 via a data line S902 by a CPU 9 and set in respective control circuits (7 and 8) in the figure (S903 and S907). The CPU 9 interprets the read data (data corresponding to 201 to 208 in FIG. 3A) and supervises overall printing control for the printing apparatus in accordance with a result of the interpretation. On the other hand, concerning processing for printing data, the CPU 9 starts a data decompression block 55 and causes the data decompression block 55 to execute the processing.

The data decompression block 55 reads out three kinds of data, "compressed TAG", "data", and "color change code", from the reception buffer 2 as shown in FIG. 3B and executes data expansion control on the basis of the data. In this embodiment, PackBits compression is used as a compression/decompression method for the data. Thus, when the compressed TAG is a value from 00h to 7Fh in 8 bits, the data decompression block 55 performs processing assuming that discontinuous one to 128 data are present in a data area. When the compressed TAG is a value from FFh to 81h in 8 bits, the data decompression block 55 performs processing for decompressing the next one byte data into continuous two to 128 data. When 80h is read in the compressed TAG, the data decompression block 55 processes 80h as a color change code. The data decompression block 55 sends the decompressed data to an image conversion block 54 via a data line S4a. HV conversion is performed in this image conversion block and data subjected to the HV conversion is stored in the print buffer 4 via a data line S4b.

The printing data subjected to the decompression and the HV conversion is stored in the print buffer 4 in a data structure shown in FIG. 4. Top data of the first color data of the first block is written in a top address of the print buffer 4. Data following the top data are written sequentially while changing an address according to circumstances. An area, in which the printing data can be stored as one color data in an address of the print buffer, is determined according to the setting data read by the CPU 9 first. Since data more than the value cannot be written, in compressing the printing data, limitation of a data size according to the setting data is applied. After the color change code is detected, the data is written sequentially from a top data of the second color data. Control for the address data is executed by the print buffer ring control structure circuit 8 explained later.

When the data decompression block 55 repeats this writing from the first color data to the eighth color data of the first block, ends the writing for the eighth color data, and detects the color change code, this means that writing for all the data in the first block ends. The data decompression block 55 ends the expansion operation for the data, informs the CPU 9, by interruption, that expansion of data for one block is completed (S906), and waits for start of the next data expansion from the CPU 9.

At a stage when printing data from plural blocks are collected on the print buffer 4, the CPU 9 actuates a carriage motor (108 in FIG. 1) in an attempt to start a printing operation, transfers the printing data in synchronization with a carriage encoder (a CR encoder) 10 while scanning the carriage mounted with the printhead 6, and prints the printing data. Consequently, the CPU 9 can complete an image on a sheet (on a printing medium). After the printhead 6 scans in a main scanning direction, conveying means conveys the printing medium in a sub-scanning direction. In this way, the scanning of the printhead and the conveyance of the printing medium are performed repeatedly to print an image for one page.

A printing data generation block 5 reads out respective block structures of printing data present on the print buffer 4 at timing synchronizing with the CR encoder 10 via a data line S5 in accordance with a value designated from the CPU 9 and outputs the block structures to a data line S6 while converting the block structures into data structures that can be printed by the printhead 6. The printing data generation block 5 holds information on a block width (indicating a length of a block) in the print buffer described later and information on heights of respective colors ("raster count" of color data) of the block.

Note that data areas of the block structures read from the print buffer 4 are cleared to be zero in order to store the next printing data.

[Write and Read Control for a Reception Buffer]

As explained above, the interface controller 1 writes data in the reception buffer 2 and the data decompression block 55 reads out only printing data from the reception buffer 2. The reception buffer ring structure control circuit 7 controls a write address and a read address for the writing and the reading. The reception buffer ring structure control circuit 7 manages a top address and a last address of the reception buffer 2 as well as a write address and a read address.

The reception buffer ring structure control circuit 7 adds a write request signal received from the interface controller 1 (S701) address by address for each reception and outputs the write request signal to the reception buffer 2 as information on the write address (S702). When the write address reaches the last address of the reception buffer 2, the reception buffer ring structure control circuit 7 performs control for returning the write address to the top address of the reception buffer 2.

When the write address reaches (coincides with) the read address, the reception buffer ring structure control circuit 7 informs the interface controller 1 via a data line S703 that the reception buffer 2 is filled with data and the next data cannot be written in the reception buffer 2.

At the same time, the reception buffer ring structure control circuit 7 also informs the CPU 9 through an interrupt signal of a data line S904 that data cannot be written in the reception buffer 2. The CPU 9 can set a structure of the reception buffer 2 by writing the structure of the reception buffer 2 in a register in the CPU 9 using a bus of a data line S903.

The CPU 9 reads out data in the reception buffer 2 directly as the read address via a register for data read that is present in the reception buffer ring structure control circuit 7. Alternatively, when the data decompression block 55 requests read of data via a data read request data line S705, data is added address by address as the read address via a data line S706 and outputted to the reception buffer 2.

When the read address reaches the last address, the reception buffer ring structure control circuit 7 performs processing for returning the read address to the top address of the reception buffer 2. When the read address reaches (coincides with) the write address, the reception buffer ring structure control circuit 7 informs the data decompression block 55 via the data line S704 that, since there is no data on the reception buffer, the next data cannot be read. At the same time, the reception buffer ring structure control circuit 7 also informs the CPU 9 through an interrupt data line of a data line S904 that there is no data to be read on the reception buffer 2.

The contents of the control processing for writing data in and reading data from the reception buffer 2 have been described. Next, contents of processing for writing data, which is read from the reception buffer 2 and subjected to expansion processing, in a print buffer or reading the data from the print buffer will be explained.

[Write and Read Control for a Print Buffer]

The image conversion block 54 writes printing data in the print buffer 4 and the printing data generation block 5 reads out the written printing data. In that case, the print buffer ring structure control circuit 8 controls a write address and a read address.

The print buffer ring structure control circuit 8 manages a top address and a last address of the print buffer as well as the write address and the read address.

Every time the print buffer ring structure control circuit 8 receives a write request (S801) from the image conversion block 54, the print buffer ring structure control circuit 8 changes an address appropriately and outputs the address to the print buffer 4 as information on a write address (S802). When the write address reaches the last address of the print buffer 4, the print buffer ring structure control circuit 8 performs control for returning the write address to the top address of the print buffer 4.

When the write address reaches (coincides with) the read address, the print buffer ring structure control circuit 8 informs the image conversion block 54 via a data line S809 that the print buffer 4 is filled with printing data and the next printing data cannot be written in the print buffer 4.

In addition, the data decompression block 55 reads a color change code from the reception buffer 2, the data decompression block 55 informs the image conversion block 54 via a data line S541 to that effect. The image conversion block 54 outputs the color change code to the print buffer ring structure control circuit 8 via a data line S807. The print buffer ring structure control circuit 8 prepares to output a top address, where the next color data is stored, from a data line S802. The CPU 9 can set a structure of the print buffer 4 by writing the structure in a register in the CPU 9 using a bus of a data line S907.

When the printing data generation block 5 requests a read address via the data read request data line S805 for each color, the read address is added with one address every time and outputted to the print buffer 4 via a data line S806.

When the read address reaches the last address, the print buffer ring structure control circuit 8 performs control for returning the read address to the top address of the print buffer 4.

The printing data generation block 5 sets a data structure of a printing data block, from which printing data is currently being read, in a register inside the printing data generation block 5 from the CPU 9 via a bus of a data line S908. When the printing data generation block 5 reads out all printing data in the set printing data block structure, the printing data generation block 5 communicates an end signal S909 to the CPU 9 as an interrupt signal. In this case, if the next printing data block is already expanded on the print buffer 4, the printing data generation block 5 writes a printing data block structure thereof in the register.

The print buffer 4 controls writing of data in units of one printing data block. Since a printing data generation block is not started for a printing data block in which printing data is not written. Thus, a read address of a print buffer never exceeds a write address. Reference numeral 11 denotes a buffer structure information memory. This is a work memory (a work RAM) for controlling a print buffer and serves as an area in which information on a print buffer structure described later is temporarily stored.

[Explanation of a Print Buffer Ring Structure Control Circuit]

Figure 5:
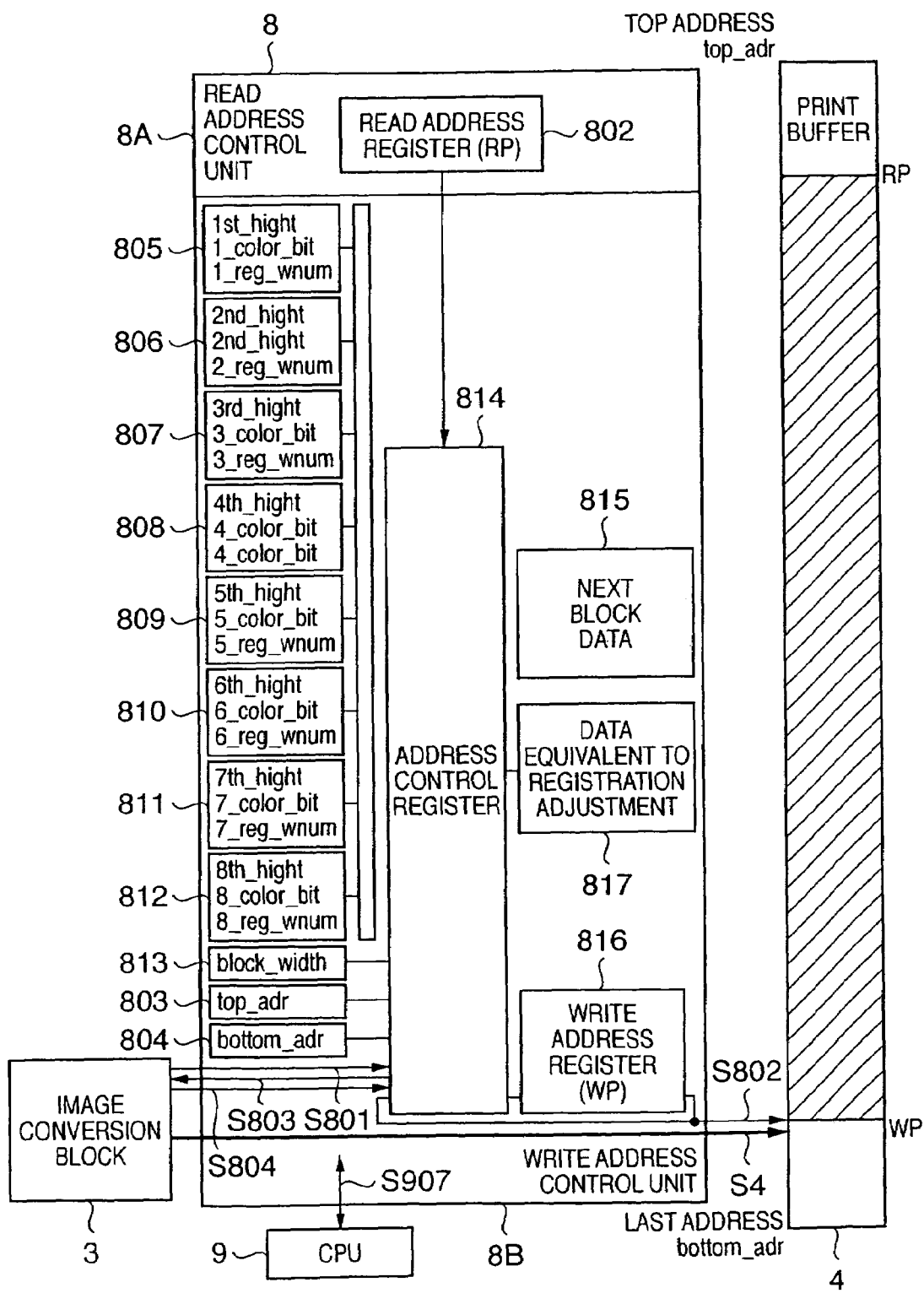
FIG. 5 is a diagram for explaining write address control of a print buffer ring structure control circuit.
Figure 7:
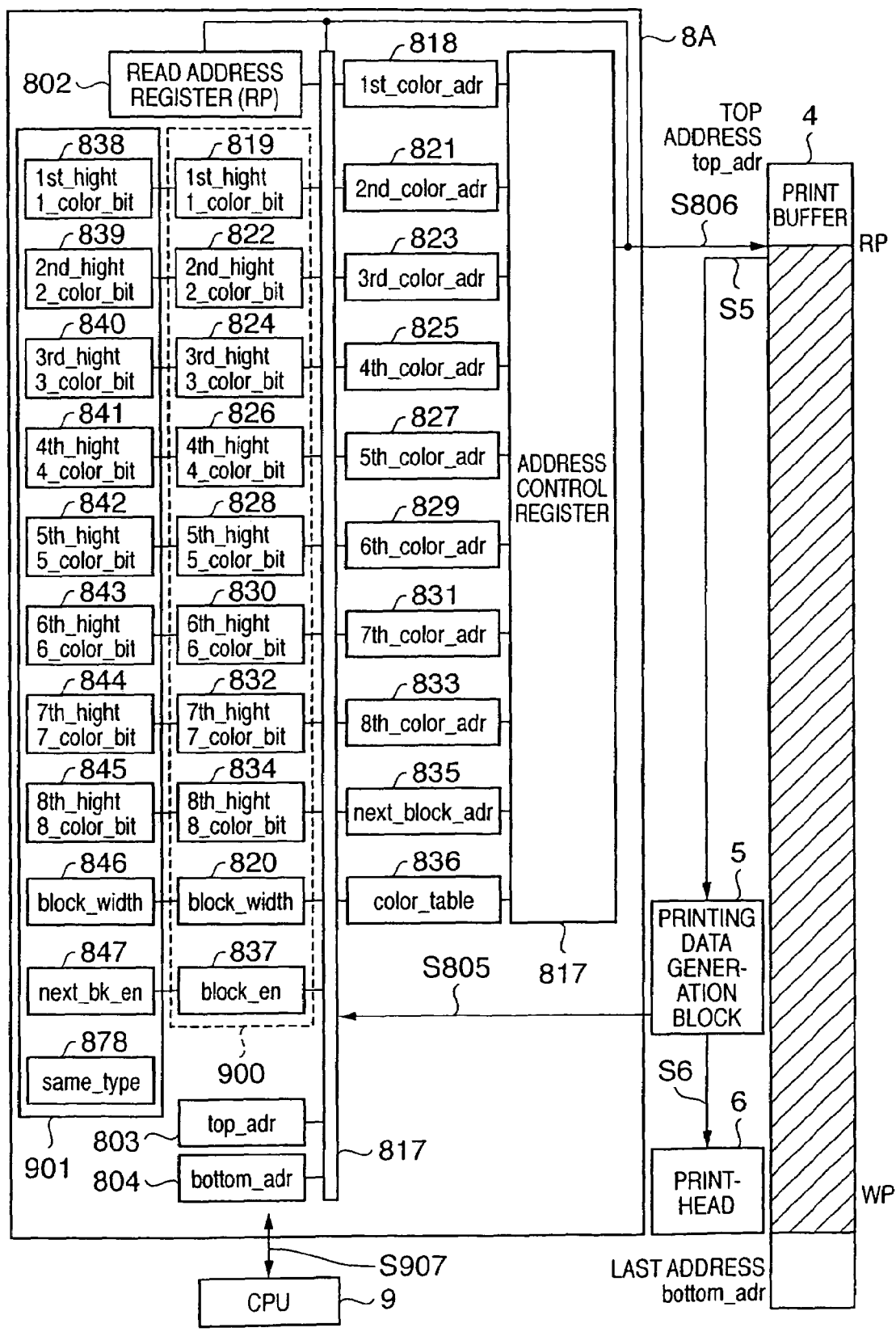
FIG. 7 is a diagram for explaining processing for reading data from the print buffer of the print buffer ring structure control circuit.

A print buffer ring structure control circuit will be explained with reference to FIGS. 5 and 7. In processing of the print buffer ring structure control circuit, FIG. 5 is a diagram for explaining mainly write address control and FIG. 7 is a diagram for explaining mainly read address control of the print buffer ring structure control circuit 8.

The print buffer ring structure control circuit 8 includes a read address control unit 8A and a write address control unit 8B. As a buffer area of the print buffer 4, a top address of the print buffer 4 is represented by top_adr and a last address thereof is represented by bottom_adr. This top address is stored in a register 803 in the write address control unit 8B and the last address is stored in a register 804 in the write address control unit 8B.

In the print buffer 4, "RP" indicates a read pointer and "WP" indicates a write pointer. A hatching part between RP and WP in the print buffer 4 indicates that printing data is stored. White parts of the print buffer 4 indicate that printing data is not stored.

Reference numeral 802 in the read address control unit 8A denotes a register indicating a read address (a read pointer: RP) of data. Reference numerals 805 to 812 denote registers for storing information on respective colors from the first color to the eighth color. Here, in the register 805, information on a height of a buffer for first color data (1st_height), information indicating existence or absence of the first color data (1_color_bit), and registration adjustment value information for the first color (1_reg_wnum) are stored. The same information on the second to the eighth colors is set for the registers 806 to 812.

Note that, since the registration adjustment value information takes a value corresponding to a relative position in a raster direction among nozzle rows, the registration adjustment value information always takes the same value for one nozzle row.

For example, when the first color data are set as a reference, registration adjustment value information for the first color data is 0 and registration adjustment value information for the second color data takes a value corresponding to a relative distance in the raster direction between a nozzle row for printing the first color data and a nozzle row for printing the second color data (e.g., corresponding to a column count).

Reference numeral 813 denotes a register for setting width information of a block (block_width). This width information is a value that is used in common in units of block from the first color to the eighth color.

The height information, the width information, and the registration adjustment value information of the block are information included in the setting data explained with reference to FIG. 3A.

Reference numeral 815 denotes a register for storing an address of the next block data. It is possible to determine this address using a value of any one of the registers 805 to 812 storing information on the respective colors and a value of the register 813 storing width information concerning block data. In accordance with setting information concerning first block data, which becomes a writing object, the write address control unit 8B determines a write start address of second block data, which becomes a writing object next, and stores the start address in this register.

Reference numeral 817 denotes a register for storing a write start address for registration adjustment. It is possible to determine this address using values of all the registers 805 to 812 storing information on the respective colors and a value of the register 813 storing width information concerning block data. In accordance with setting information concerning first block data, which becomes a writing object, the write address control unit 8B determines a write start address for registration adjustment, which becomes a writing object next, and stores the start address in this register.

For example, concerning the first color data, when the first color data are stored in a predetermined raster position, the write address control unit 8B determines write start address information in a second block, on which the first block data equivalent to a registration adjustment width is reflected, before completion of writing of printing data corresponding to the first block data. Therefore, as described later with reference to FIG. 8, it is possible to store printing data, which cannot be stored in the first block, in a top address corresponding to the same raster position of the first color data in the second block. The same holds true for the other color data (the second color data to the eighth color data).

The write address control unit 8B can update write address information equivalent to a registration width of the first block data to the determined write start address before completion of writing of printing data corresponding to the first block data.

Reference numeral 816 denotes a register for storing a write address (WP) of data.

Reference numeral 814 denotes an address control register, which manages writing processing and read processing such that a write address (WP) does not overcome a read address (RP) (such that both the addresses do not designate overlapping addresses).

[Storage of Data in a Print Buffer (FIGS. 6A to 6D)]

Figure 6A:
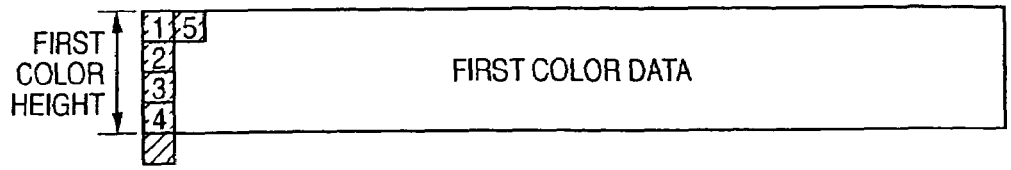
FIGS. 6A to 6D are diagrams for explaining how printing data is stored in a print buffer.

FIGS. 6A to 6D are diagrams for explaining how printing data is stored in the print buffer 4. FIG. 6A shows a state in which data for four words are stored in each line in order as first color data. Here, one word corresponds to sixteen pixels. When it is assumed that an address for storing information in a register is incremented one by one, a write pointer (WP) is counted 1, 2, 3, 4, 5, and so on.

For example, in a setting for a register in FIG. 6A, a value of height information (a raster count) of a buffer (1st_height) is "4" and a value of information on presence or absence of data (1_color_bit) is "1 (present)". A value of the register 813 (width information of a block: block_width) is "28".

Figure 6B:
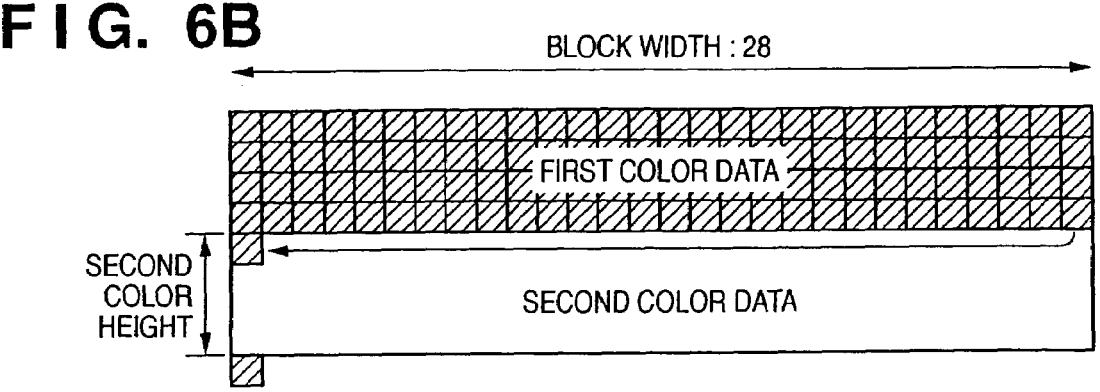
Figure 6C:
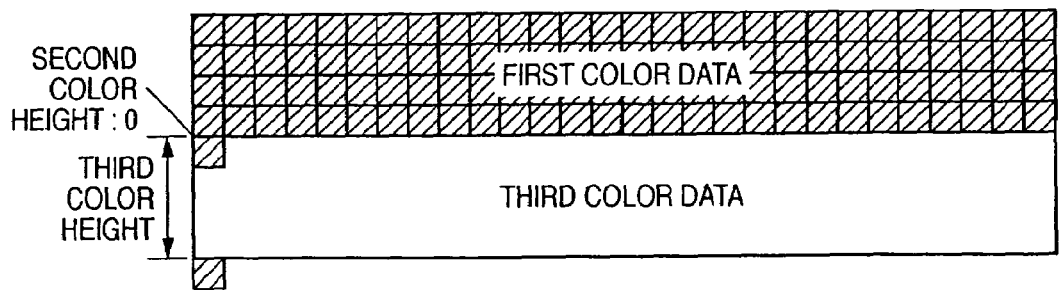

FIG. 6B is a diagram showing writing of data in the print buffer 4 when there is second color data. After storing all data in a storing area of the first color, the write pointer (WP) is moved to a top address of the second color as indicated by an arrow to store data of the second color. In FIG. 6C, when there is no second color data, third color data is stored following the storing area of the first color data. In this case, the information on presence or absence of second color data (2_color_bit) in the register 806 shown in FIG. 5 is "0 (absent)" indicating that there is no data. If height information (2nd_height) of the buffer is "0", it is indicated that there is no data. Thus, this information may be used. Alternatively, AND operation (AND processing) for information on presence or absence of data and height information of the buffer may be provided to judge presence or absence of data.

Figure 6D:
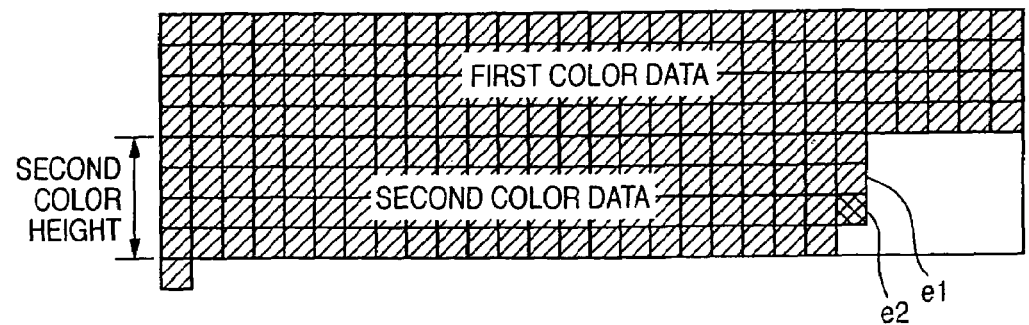

In FIG. 6D, concerning the second color data, e1 (WP: write pointer) indicating a writing position indicates that writing is stopped before e2 (RP: read point) indicating a read position. This is to prohibit writing of data in a position where read does not end to perform control for preventing data from being overwritten. The same control is also applied to areas of the third color to the eighth color.

[Processing for Storing Data in a Print Buffer]

Figure 8:
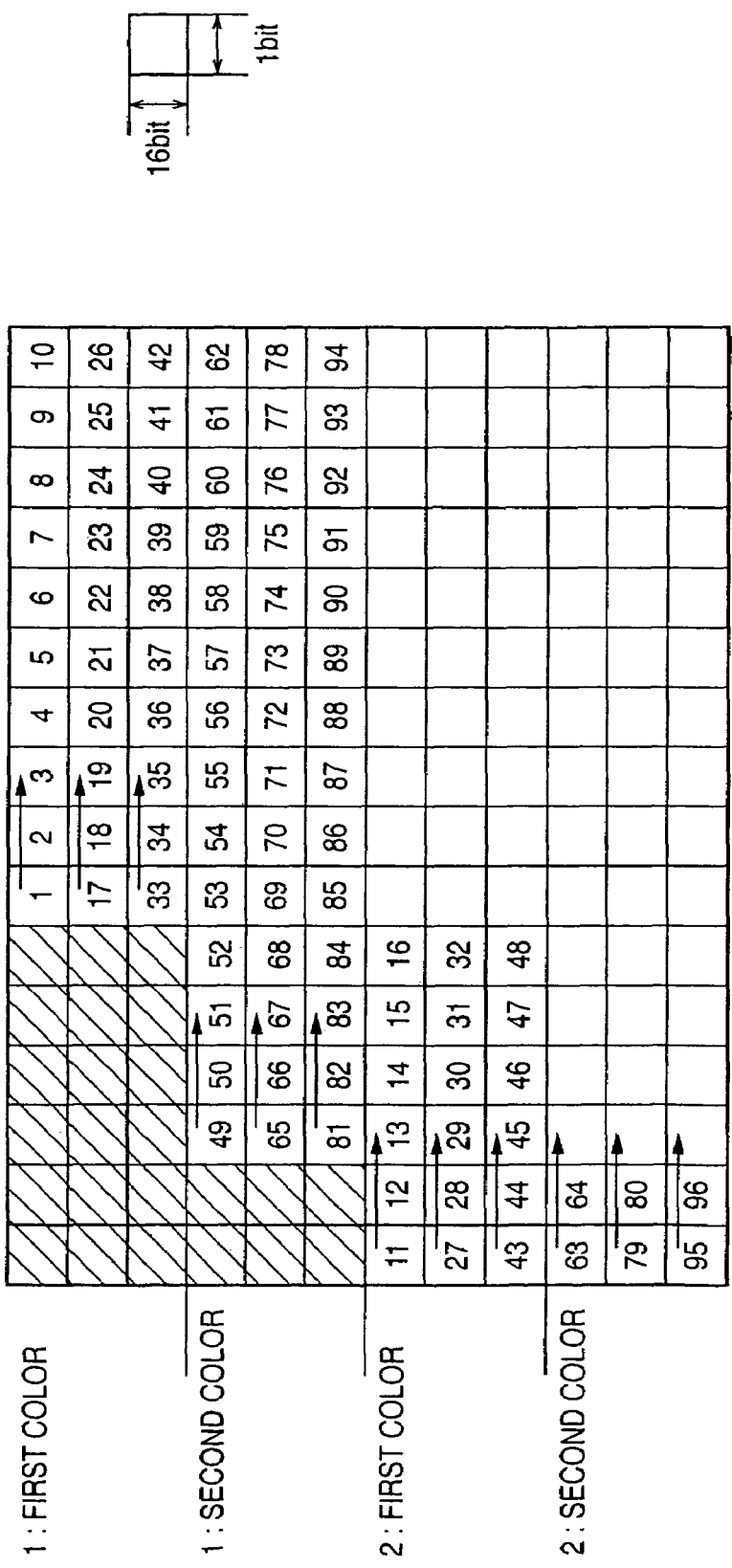
FIG. 8 is a diagram for explaining a writing order of data at the time when a registration adjustment value is not zero.

FIGS. 8 and 9 are diagrams for explaining how printing data is stored in the print buffer 4 when a registration adjustment value is not zero. FIGS. 8 and 9 show a state in which data for three words are stored in each line in order as first color data. Here, one word corresponds to sixteen pixels.

FIG. 8 indicates an order for inputting data and FIG. 9 indicates addresses in which data are actually written.

Shaded parts in FIGS. 8 and 9 indicate a registration adjustment value (6) for a first color and a registration adjustment value (2) for a second color. An actual write start position is a position shown in FIG. 8. However, an actual address starts from a position skipped in association with a registration adjustment value (e.g., 24, a seventh address from the left) as shown in FIG. 9.

Since FIGS. 8 and 9 are associated with each other, for example, an address of data to be written first is 24 as shown in FIG. 9 and an address of data to be written second is 2A as shown in FIG. 9.

Here, as a setting in FIGS. 8 and 9, a value of height information (a raster count) of a buffer (1st_height) is "3" and a value of information on presence or absence of data (1_color_bit) is "1 (present)". A value of the register 813 (width information of a block: block_width) is "16". A registration adjustment value for the first color (1_reg_wnum) is 6 and a registration adjustment value for the second color (2_reg_wnum) is 3.

In this case, for example, in FIG. 8, when an address for storing information in a register is incremented one by one to the right, an actual address of the write pointer (WP) is counted up as 0, 6, C, 12, 18, and so on in FIG. 9.

As an order of writing data, data may be written downward in each row in units of sixteen as shown in FIGS. 8 and 9 or may be written up to a block width (in units of ten) in one row according to an order of reception of data and then written downward in the next row after that (in FIG. 8, after data is written in a position of 10, the next data is written in a position of 17).

As shown in FIG. 8, concerning the first color data, after tenth data is written (stored), eleventh data is written at a top of the next block (a second block). This is because data, which cannot be written in a present block (a first block) as a result of registration adjustment, is written (stored).

When writing of data equivalent to registration adjustment ends (when writing of sixteenth data ends in FIG. 8), seventeenth data is written in the present block (the first block). This means that, in FIG. 9, an actual address of the sixteenth data is DE and an actual address of the seventeenth data is 26.

In this way, the first color data are written while the registration adjustment is performed by writing data in the present block (the first block) and then writing the data in the next block (the second block).

When writing of all the first color data is finished, the same processing is applied to the second and subsequent colors of the first block.

The address for storing information in a register may be incremented one by one vertically as shown in FIGS. 6A to 6D to count up an actual address of the write pointer (WP) 0, 2, 4, 6, 8, and so on.

Here, the address for storing information in a register is not incremented vertically one by one in FIG. 8. This is for the purpose of coping with a change of data from the image conversion block 3 or data from a host flexibly.

For example, when the image conversion block 3 is not used, for printing data from the host, as usual, the address for storing information in a register is incremented one by one as shown in FIG. 6A to count the write pointer (WP) as 1, 2, 3, 4, 5, and so on.

However, when HV conversion or the like is performed using the image conversion block 3, for printing data after the HV conversion, it is impossible to increment the address for storing information in a register one by one as shown in FIG. 6A to count up the write pointer (WP) 1, 2, 3, 4, 5, and so on.

Therefore, it is possible to cope with various data transfer systems from the host and data conversion in the image conversion block 3 by giving a degree of freedom to an increment amount of an address.

[Data in a Print Buffer According to Registration Adjustment]

Figure 10A:
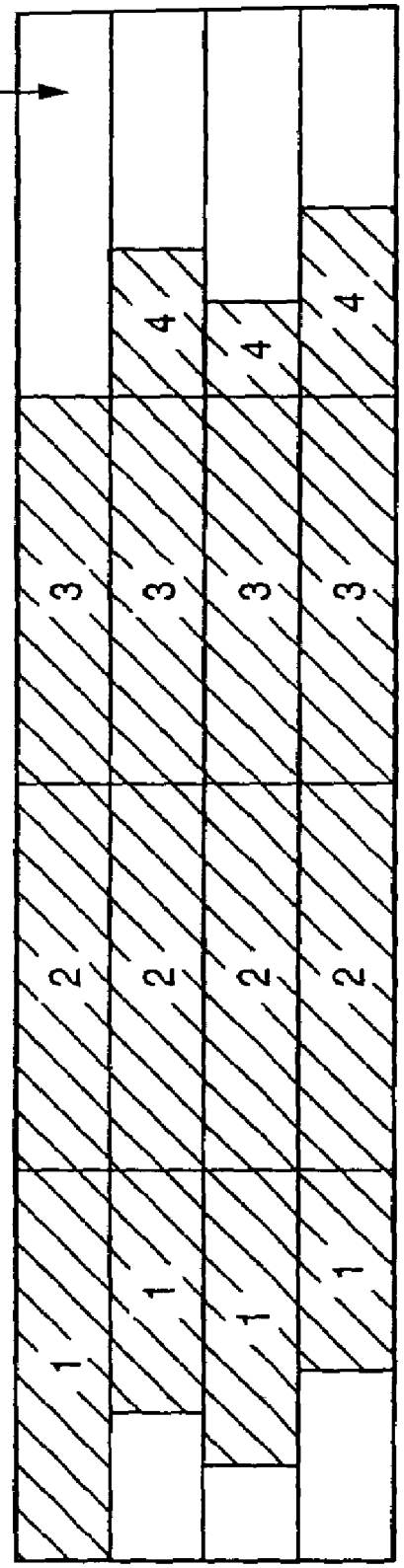
Figure 10B:
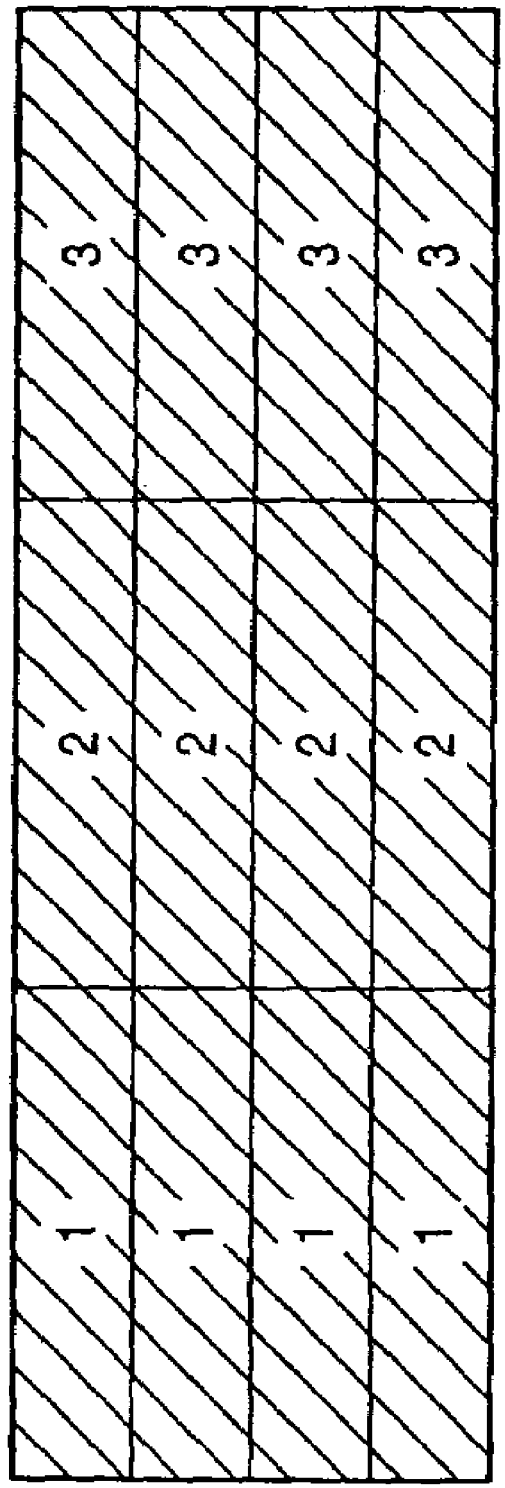

FIGS. 10A to 10C are diagrams schematically showing a state of data related to registration adjustment. All numerals in the figures indicate block numbers. FIG. 10A shows transfer data at the time when registration adjustment is entirely performed in the host computer (the printer driver). FIG. 10B shows data transmitted from the host computer and received by the printing apparatus. Registration adjustment is not applied to the data. FIG. 10C shows data that is obtained by subjecting the data shown in FIG. 10B to registration adjustment on the printing apparatus side and stored in a print buffer.

When the data shown in FIGS. 10A and 10C are printed on a printing medium, since both the data are subjected to registration adjustment, the same printing results are obtained. However, the data in FIG. 10C is obtained by subjecting the reception data in FIG. 10B to registration adjustment on the printing apparatus side. Thus, a block position shifts in a raster direction and, as a result, the number of blocks is increased by one from the data in FIG. 10B.

When the number of blocks transmitted from the host computer and the number of blocks written in the print buffer of the printing apparatus are different, logical contradiction occurs.

In order to prevent such contradiction from occurring, when the data shown in FIG. 10B is transferred from the host computer to the printing apparatus, extra data for one block is added to the data such that the number of blocks in the host computer and the number of blocks in the printing apparatus (the print buffer) are the same.

Figure 11A:
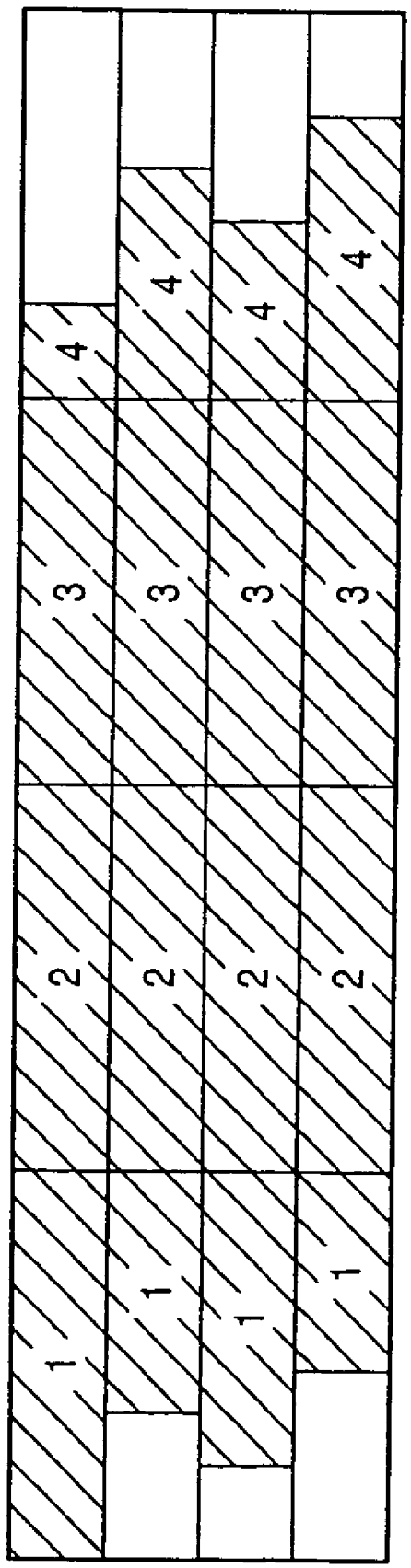
Figure 11B:
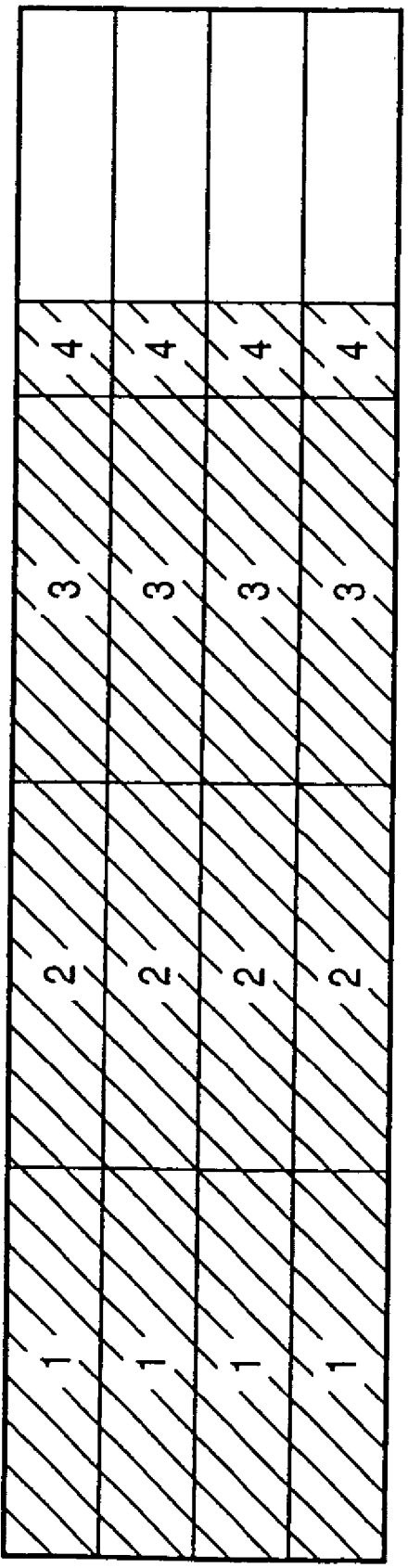

FIGS. 11A to 11C are diagrams showing a state of data related to registration adjustment as in FIGS. 10A to 10C. FIG. 11A shows data transfer at the time when registration adjustment is entirely performed in the host computer (the printer driver). The data has the same structure as that in FIG. 10A. FIG. 11B shows data transmitted from the host computer and received by the printing apparatus. Registration adjustment is not applied to the data. FIG. 11C shows data that is obtained by subjecting the data shown in FIG. 11B to registration adjustment on the printing apparatus side and stored in a print buffer.

When the data shown in FIGS. 10B and 10C and the data shown in FIGS. 11B and 11C are compared, it is seen that, although the number of blocks of the data in FIG. 10C obtained by subjecting the reception data in FIG. 10B to registration adjustment is increased by one, the number of blocks of the data in FIG. 11C obtained by subjecting the reception data in FIG. 11B to registration adjustment is not increased. In other words, when the data shown in FIG. 11B is transferred from the host computer, it is unnecessary to transmit extra data for one block.

In relation to FIGS. 10B and 10C, the transfer of extra data for one block will be explained more specifically. FIGS. 12A to 12C are diagrams showing a data structure at the time when extra data for one block is transferred. In this case, a position of a color change code of the block of the transferred (added) extra data should be noted.

Figure 12D:
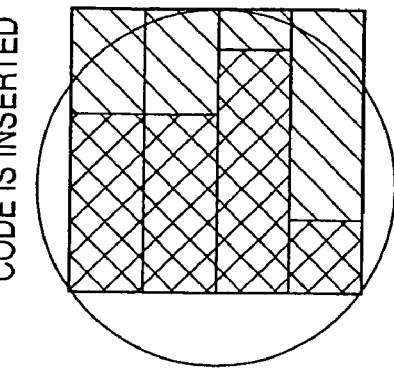
FIGS. 12A to 12D are diagrams showing a data structure of a final block according to the registration adjustment.
Figure 12C:
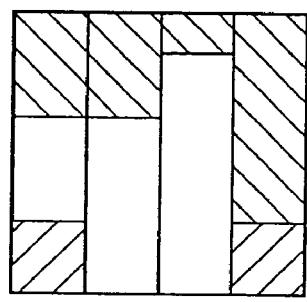
Figure 12B:
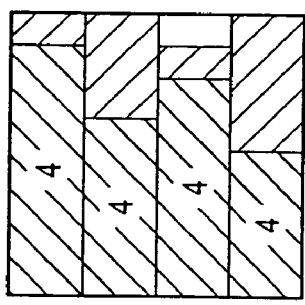
Figure 12A:
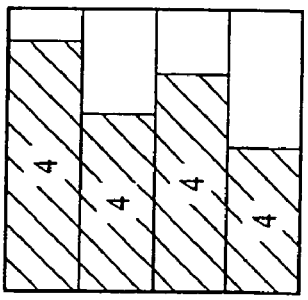

FIG. 12A shows data before compression, FIG. 12B shows a state in which a registration adjustment width is added to the data before compression, FIG. 12C shows a registration adjustment width on the basis of a rear edge of the increased block, and FIG. 12D shows a position where the color change code is inserted (a position where the color change code should be inserted). Note that a block in FIG. 12B is assumed to be an nth block and a block in FIG. 13C is assumed to be an n+1$^{st}$ block.

In this case, a position of the color change code is required to be within an area of a cross hatch in FIG. 12D. This is because, if the color change code is in an area of a shaded part in FIG. 12D, further one block is increased by registration adjustment.

FIGS. 13A to 13D are similar to FIGS. 12A to 12D. FIG. 13A shows data before compression, FIG. 13B shows a state in which a registration adjustment width is added to the data before compression, FIG. 13C shows a registration adjustment width on the basis of a rear edge of the increased block, and FIG. 13D shows a position where the color change code should be inserted. FIGS. 13A to 13D are different from FIGS. 12A to 12D in that extra data for one block is not transferred.

In this case, again, if the color change code is in areas other than an area of a cross hatch in FIG. 13D, one block is increased by registration adjustment. Thus, as shown in FIG. 13D, a position of the color change code is required to be before a boundary of the registration adjustment width based on the rear edge shown in FIG. 13C.

[Data of a Registration Adjustment Value]

Figure 14A:
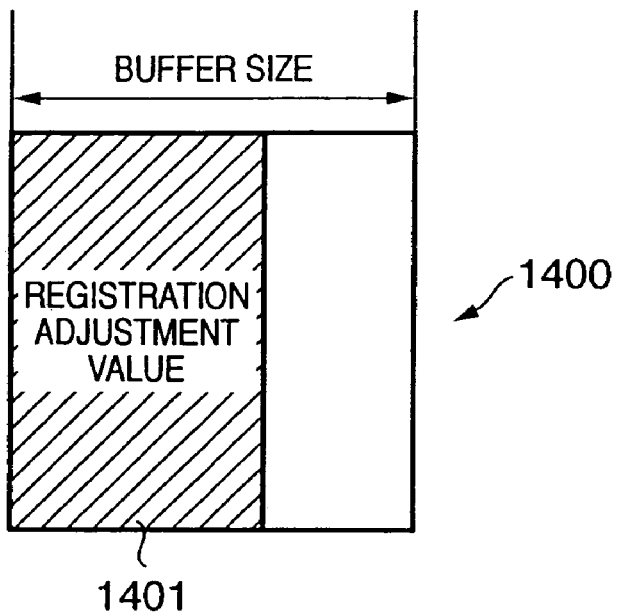
FIGS. 14A and 14B are diagrams schematically showing a ratio of a registration adjustment value in a buffer capacity.
Figure 14B:
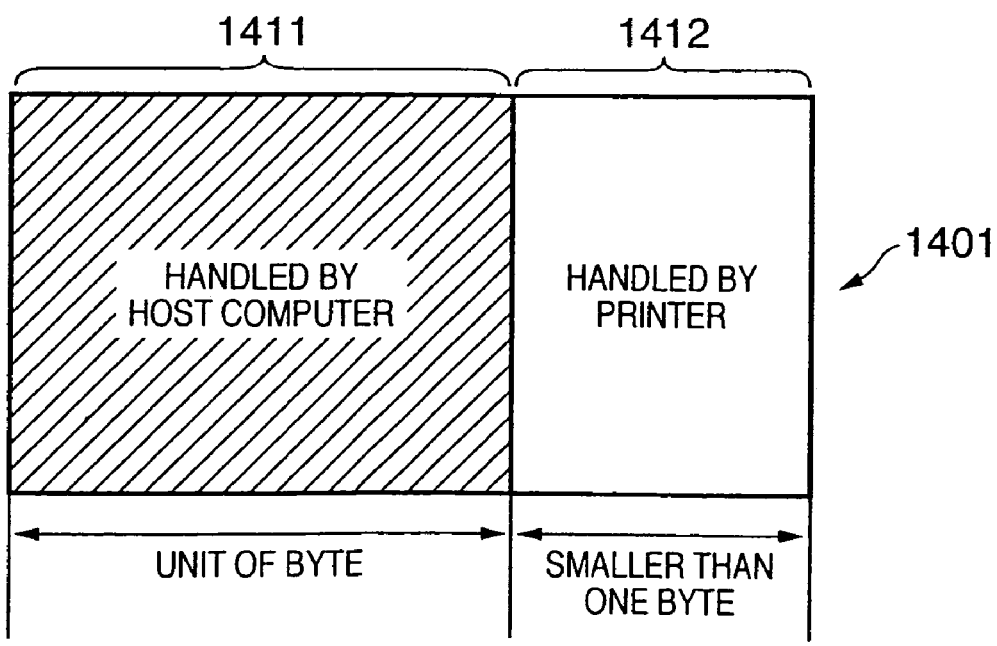

FIG. 14A schematically shows a ratio of an adjustment area (adjustment amount) in basis of a registration adjustment value in a capacity of a print buffer at the time when registration adjustment is performed only on the printing apparatus side. FIG. 14B schematically shows details of the registration adjustment value.

As shown in FIG. 14A, in a print buffer 1400, a portion occupied by the registration adjustment value is set as 1401. As shown in FIG. 14B, the registration adjustment value 1401 is divided into an adjustment value 1411 in units of byte and an adjustment value 1412 smaller than one byte (in units of bit).

In this embodiment, the registration adjustment value 1401 is divided such that the registration adjustment value 1411 in units of byte is handled by the host computer and the registration adjustment value 1412 smaller than one byte, which cannot be divided into a value in units of byte, is handled by the printing apparatus.

Figure 15A:
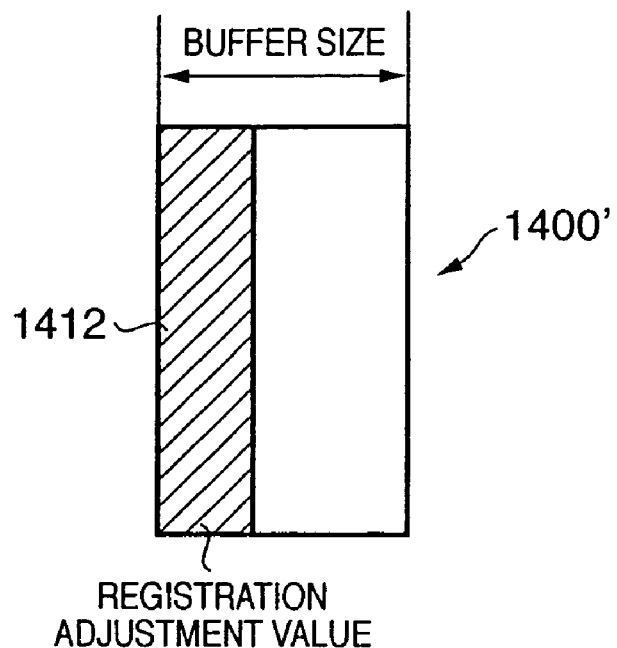
FIGS. 15A and 15B are diagrams schematically showing a ratio of a registration adjustment value in a buffer capacity.
Figure 15B:
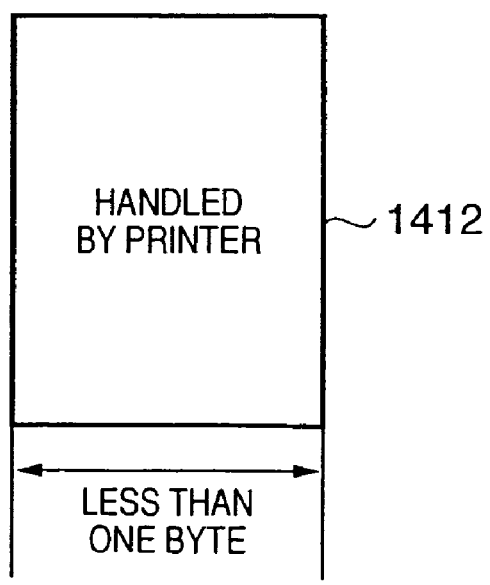
Figure 17:
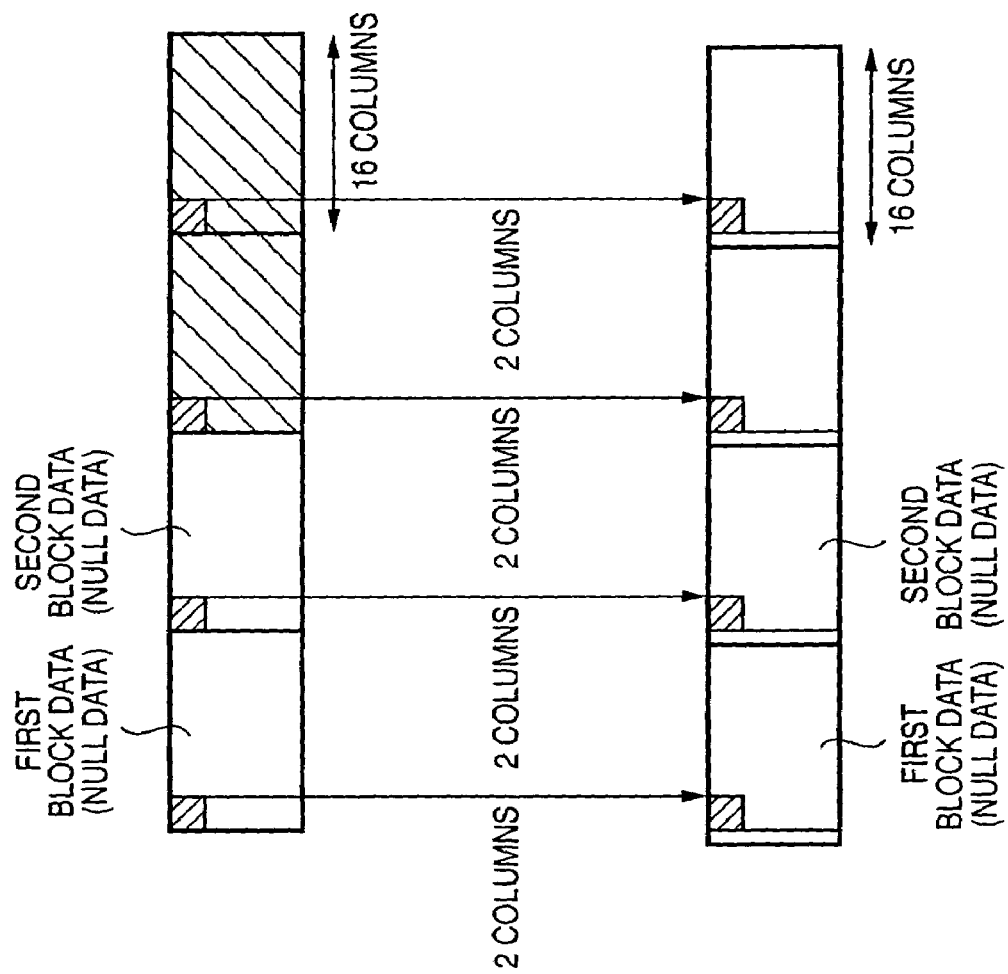
FIG. 17 is a diagram for explaining storage of data according to registration adjustment.

FIG. 15A schematically shows a ratio of an adjustment area (adjustment amount) in basis of a registration adjustment value in a print buffer 1400' of the printing apparatus in this embodiment. FIG. 15B schematically shows details of the registration adjustment value. As shown in FIG. 15B, only the registration adjustment value 1412 smaller than one byte (in units of bit) is stored in the print buffer 1400' of the printing apparatus. Therefore, as it is evident from comparison with FIGS. 14A and 14B, it is possible to set a capacity of the print buffer 1400' of the printing apparatus smaller than that at the time when registration adjustment is performed only on the printing apparatus side. Here, in an example shown in FIG. 17, concerning data of a certain nozzle row, in a case where the registration adjustment value to be performed is 34 columns, the remainder of the registration adjustment value divided by data unit to be performed by the host apparatus is a registration adjustment value to be performed by the printing apparatus.

In this example, 34/8=4, and the remainder is 2, that is, the host apparatus performs the registration adjustment of 32 columns in units of 4 bytes, and the printing apparatus performs the registration adjustment of 2 bits (equivalent to two columns), which is smaller than one byte.

Therefore, in the host apparatus, null data of two blocks (32 columns=16 columns×2) corresponding to 4 bytes is added to the print data of one scan and then, the print data is transferred to the printing apparatus.

The printing apparatus performs processing for storing data by shifting the data by a value equivalent to two bits for all the blocks.

A method of processing for dividing a registration adjustment value into an adjustment value in the host computer and an adjustment value in the printing apparatus will be explained.

First, in the host computer, the registration adjustment value is divided into data in units of byte and data smaller than a byte when printing is started. Data smaller than a byte is handled in units of bit.

A processing method after this is roughly divided into two methods: a method of processing data using a table in both the host computer and the printing apparatus and a method of processing data without using a table.

This table has a registration adjustment value for each nozzle row. For example, when a first nozzle row (a group of nozzles with even numbers) and a second nozzle row (a group of nozzles with odd numbers) are provided for a color cyan in a printhead, the table has adjustment values for the respective nozzle rows. Similarly, when the printhead has two rows of nozzles for respective colors magenta, yellow, and black, the table has two adjustment values for the nozzle rows of the respective colors. Therefore, in this case, the table has eight (2×4) adjustment values as one table. It is possible to control misregistration of ink discharged from the respective nozzle rows according to the adjustment values.

When a carriage performs reciprocating printing, the table may have a table for a forward path and a table for a backward path. When the carriage has plural scanning speeds, the table may have tables corresponding to the respective speeds.

For example, the table may have tables in a speed priority mode and an image quality priority mode.

In addition, if a nozzle row includes different nozzles such as nozzles for a large dot and a small dot, the table may have adjustment values matching the sizes of the dots as a table.

These tables may be stored in a ROM provided in a control circuit of the printing apparatus in advance or may be inputted from the host computer and stored in a RAM provided in the control circuit.

The method of processing data using tables will be explained. Same tables are prepared in the host computer and the printing apparatus. At the time of printing, data smaller than a byte not handled by the host computer and a registration adjustment value changeable by a user, which is stored in the printing apparatus, are added up with reference to values of the same tables.

This work is performed in both the host computer and the printing apparatus. Then, when the added-up value exceeds 8 bits, data in units of byte is handled by the host computer and the remaining data smaller than 8 bits is treated as a value that is set in a register by the printing apparatus.

The same tables are used in the host computer and the printing apparatus in this way. This makes it possible to reduce an amount of data transmitted from the host computer to the printing apparatus or an amount of data transmitted from the printing apparatus to the host computer. Thus, it is possible to reduce time required for transfer of data from the host computer to the printing apparatus.

On the other hand, the method of processing data without using a table will be explained. The host computer reads out a registration adjustment value changeable by a user, which is stored in the printing apparatus main body, and adds up the registration adjustment value with the data in units of bit that is not handled by the host computer. In this case, when the added-up value exceeds 8 bits, data in units of byte is handled by the host computer and the remaining adjustment value smaller than 8 bits is transferred to the printing apparatus as a registration adjustment value handled by the printing apparatus.

An adjustment value calculated by the host computer is transmitted to the printing apparatus in this way. This makes it unnecessary to provide the same tables in both the host computer and the printing apparatus. Thus, it is possible to control program capacities in the host computer and the printing apparatus.

The three methods have been described. Actually, an optimum method is selected taking into account a program capacity and a transfer speed to be used, cost of hardware, and the like.

FIGS. 16A to 16I are diagrams for explaining how registration adjustment values are allocated to the host computer and the printing apparatus when, for example, the registration adjustment values are 8 bits to 16 bits. These figures indicate the cases in which the registration adjustment values are 8 bits to 16 bits, respectively. Note that the registration adjustment values are not limited to 8 bits to 16 bits.

In the figure, a part in units of 8 bits is adjusted by the host computer and a part smaller than 8 bits is adjusted by the printing apparatus. In this way, in this embodiment, when registration adjustment values are 9 bits to 12 bits, adjustment of +1 bit to +4 bits for the respective registration adjustment values is handled by the printing apparatus. When registration adjustment values are 12 bits to 15 bits, adjustment of −3 bits to −1 bit for the respective registration adjustment values is handled by the printing apparatus.

Here, the registration adjustment values from 13 bits to 15 bits shown in FIGS. 16F to 16H are represented by negative values rather than positive values. This is for the purpose of reducing the number of bits representing a registration adjustment value. For example, if a registration adjustment value is given as a positive value when the registration adjustment value is 13 bits as shown in FIG. 16F, the registration adjustment value is represented as (8×1+5) bits. Similarly, when a registration value is 14 bits as shown in FIG. 16G, the registration value is represented as (8×1+6) bits. In comparison, since a registration adjustment value is given as a negative value in this embodiment, it is possible to reduce a registration adjustment value in the printing apparatus by 2 to 6 bits.

Note that, in the illustrated example, when a registration adjustment value is 12 bits, the registration adjustment value is represented as (8×1+4) bits. However, this may be represented as (8×2−4) bits.

Registration adjustment in units of byte handled by the host computer is performed by adding a null data or the like to a top of every one scan of printing data. This makes it possible to handle a registration adjustment value added with the null data or the like as printing data in the printing apparatus.

In this way, according to this embodiment, it is possible to always set a registration adjustment value handled by the printing apparatus to a small value of about 1 byte including a sign. This makes it unnecessary to change a capacity of a print buffer according to a registration adjustment value or set a buffer capacity large in advance and makes it possible to set a required capacity of the print buffer to an appropriate size (a necessary minimum size).

In addition, since registration adjustment performed in the host computer is only processing in units of byte, it is possible to reduce a load in the host computer, reduce time required for transfer of data from the host computer to the printing apparatus, and reduce time until printing is performed after start of printing is instructed.

[Read of Data from a Print Buffer]

Processing for reading data from a print buffer will be explained with reference to FIG. 7. In FIG. 7, the left side shows the read address control unit 8A of the print buffer ring structure control circuit 8 and the right side shows the print buffer 4.

A buffer area of the print buffer 4 is represented by top_adr, which is a top address of the print buffer, and a last address is represented by bottom_adr. The top address is stored in the register 803 and the last address is stored in the register 804. "RP" shown in the print buffer is a read pointer as in FIG. 5 and "WP" is a write pointer. A hatching portion between RP and WP in the print buffer 4 indicates that printing data is stored. The other portions indicate that printing data is not stored.

Reference numeral 802 in the read address control unit 8A denotes a register indicating a read address (read pointer: RP) for data. Reference numeral 900 indicted by a broken line frame denotes a first register group and 901 indicated by a solid line frame denotes a second register group.

When printing data from a first block to an eighth block are printed, for example, at the time of start of scanning, information on the first block is stored in the first register group. Information on the second block is stored in the second register group. When the printing of the first block ends, the information in the second register group 901 is copied and stored in the first register group 900. Information on the third block is stored in the second register group 901. The same processing is performed in order until data of the last eighth block is stored.

At the time of start of the next scanning, information on the first block is stored in the first register group and information on the second block is stored in the second register group.

When printing of an nth block indicated by the first register group ends, if information on an $n+1^{st}$ block is not stored in the second register group, printing data of the $n+1^{st}$ block is not prepared yet. Thus, the information in the second register group is not copied to the first register group and the read of data from the print buffer is stopped.

A register 819 in the first register group is a register for setting height information on a first color (1st_height) and information on presence or absence of color data of the first color (1_color_bit). Respective registers 822, 824, 826, 828, 830, 832, and 834 are registers for setting height information and information on presence or absence of color data concerning second to eighth colors in the same manner.

Reference numeral 820 denotes a register for storing width information on respective block data (block_width). This width information is a value that is used in units of block in common from the first to the eighth colors.

A register 818 is a register for storing a read address of the first color (1st_color_adr). When data of the first color is read from the print buffer 819 in which the data is stored, the address is updated. For example, as shown in FIG. 8A, data equivalent to one column in the first color data are read from 1 to 4. Registers 821, 823, 825, 827, 829, 831, and 833 are registers for storing read addresses of the second to the eighth colors, respectively. As color data of the second to the eighth colors, data equivalent to one column are read in order in the same manner as the color data of the first color.

Since the data stored in the print buffer 4 includes plural color data, for example, when the color data of the first color, the second color, and the like are mixed, addresses for storing color data in units of respective colors are not continuous. Therefore, if there is one register for a read address, for example, when an address of a print buffer 1 of the second color is read next to an address of the print buffer 4 of the first color, it is necessary to calculate an address. However, it is possible to omit the address calculation in performing read in units of column by preparing a register for storing a read address for each of the colors in the print buffer 4.

Reference numeral 817 denotes an address control register. When the printing data generation block 5 requests a read address for each of the colors via the data read request data line S805, the address control register 817 adds addresses one by one and outputs the addresses to the print buffer 4 via the data line S806 as the read address.

Reference numeral 835 denotes a register for storing an address of the next block. If a block, from which data is currently read, is a first block, a top address of a second block is stored in this register. When the read of the data in the block being currently read ends, a value of this register is copied to the register 802. Consequently, it is possible to read the next block data smoothly.

A register 836 is a table for storing information for specifying an order of reading the first to the eighth colors. It is possible to freely set an order of reading data from a print buffer according to a value set in this table. For example, it is possible to read data in an order of the first color, the second color, . . . , the eighth color. In addition, when the value is changed, it is possible to read the data in an order of the first color, the second color, the fifth color, the sixth color, the seventh color, and the eighth color by skipping the data of the third color and the fourth color. Consequently, it is possible to accurately skip (neglect) printing data of colors that are not stored.

The second register group 901 is a collection of buffers for storing information on the next block data. When the respective registers of the first register group are read, values set in the respective registers of the second register group are set in the corresponding registers of the first register group. For example, a value set in a register 838 is set in the register 819.

Registers 839 to 845 are registers in which the same information is set concerning the color data of the second to the eighth colors in the next block data.

Height information of a buffer of the first color data and information indicating presence or absence of the first color data are stored in the register 838 (819).

Reference numeral 846 (820) denotes a register for setting width information of a block. This width information is a value that is used in common in units of block from the first to the eighth colors.

A register 878 is a register for storing information indicating whether a size of a block set earlier and a size of a block are the same (same_type). When the sizes of the blocks are the same, this value is set to "1", whereby it is possible to reset the same value in the first register group easily. In this case, the setting for the registers 838 to 846 may be omitted. On the other hand, when a value of the register 878 is "0", values are set in the registers 838 to 846, respectively.

According to the preferred embodiment explained above, in the inkjet printing apparatus, registration adjustment in units of byte in a scanning direction is performed by the host computer and registration adjustment in units of bit in the scanning direction is performed by the printing apparatus. Consequently, it is possible to reduce time required for transfer of printing data from the host computer, reduce a buffer capacity required by the printing apparatus, and provide the inkjet printing apparatus inexpensively.

Other Embodiments

In the example explained in the embodiment, the invention is applied to the inkjet printing apparatus that performs printing in accordance with the inkjet system. However, it is possible to apply the invention to printing apparatuses of other systems as long as the printing apparatuses perform printing by scanning a printhead, in which plural printing elements are arranged, in a direction crossing an arrangement direction of the printing elements.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy. According to this inkjet printer and printing method, a high-density, high-precision printing operation can be attained.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

The present invention can be applied to a system comprising a plurality of devices (e.g., host computer, interface, reader, printer) or to an apparatus comprising a single device (e.g., copying machine, facsimile machine).

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-163752, filed Jun. 1, 2004, which is hereby incorporated by reference.

What is claimed is:

1. A printing apparatus that performs printing by scanning a printhead having plural arrays of printing elements, in which plural printing elements are arranged in a predetermined direction, in a direction crossing the predetermined direction, comprising:
   a reception buffer that stores printing data of the respective arrays of printing elements subjected to adjustment by a first unit concerning a relative position in the scanning direction among the respective arrays of printing elements and setting data including registration information by a second unit smaller than the first unit concerning the relative position in the scanning direction, the data being transmitted from a host apparatus connected to the printing apparatus;
   a print buffer that stores printing data of the respective arrays of printing elements in association with printing positions in the scanning direction; and
   write control means that performs control to adjust storing locations of the printing data of the respective arrays of printing elements by the second unit on the basis of the registration information and store the printing data in the print buffer.

2. The printing apparatus according to claim 1, wherein the first unit is a byte and the second unit is a bit.

3. The printing apparatus according to claim 1, further comprising:
   read control means that controls read address information for reading the printing data stored in the print buffer for each of the arrays of printing elements; and
   printing control means that performs printing by driving the respective arrays of printing elements in accordance with the printing data that is read on the basis of the read address information.

4. The printing apparatus according to claim 1, wherein the printing apparatus performs printing with different colors according to the respective arrays of printing elements.

5. The printing apparatus according to claim 1, wherein
   a printing area in the scanning direction is divided into plural blocks and the print buffer stores printing data for each of the blocks, and
   the write control means has a register for storing information for distinguishing presence or absence of data included in the printing data, a raster count of the data, and registration information of the data for each of the arrays of printing elements.

6. The printing apparatus according to claim 5, wherein the write control means controls address information to be stored in the print buffer according to presence or absence of the printing data of the respective arrays of printing elements in the respective blocks.

7. The printing apparatus according to claim 1, wherein the printing apparatus performs printing by discharging ink from the respective printing elements.

8. A data processing method for a printing apparatus that performs printing by scanning a printhead having plural arrays of printing elements, in which plural printing elements are arranged in a predetermined direction, in a direction crossing the predetermined direction and includes a reception buffer that stores printing data of the respective arrays of printing elements subjected to adjustment by a first unit concerning a relative position in the scanning direction among the respective arrays of printing elements and setting data including registration information by a second unit smaller than the first unit concerning the relative position in the scanning direction, the data being transmitted from a host apparatus connected to the printing apparatus, and a print buffer that stores printing data of the respective arrays of printing elements in association with printing positions in the scanning direction, the data processing method comprising:
   a write control step of performing control to adjust storing locations of the printing data of the respective arrays of printing elements by the second unit on the basis of the registration information and store the printing data in the print buffer;
   a read control step of controlling read address information for reading the printing data stored in the print buffer for each of the arrays of printing elements; and
   a printing control step of performing printing by driving the respective arrays of printing elements in accordance with the printing data that is read on the basis of the read address information.

9. A printing system comprising:
   a printing apparatus that performs printing by scanning a printhead having plural arrays of printing elements, in which plural printing elements are arranged in a predetermined direction, in a direction crossing the predetermined direction; and
   a host apparatus that is connected to the printing apparatus and transmits setting data and printing data to the printing apparatus, wherein
   the host apparatus transmits printing data of the respective arrays of printing elements subjected to adjustment by a first unit concerning a relative position in the scanning direction among the respective arrays of printing elements and setting data including registration information by a second unit smaller than the first unit concerning the relative position in the scanning direction among the respective printing elements, and
   the printing apparatus includes a print buffer that stores printing data of the respective arrays of printing elements in association with printing positions in the scanning direction and performs control to adjust storing locations of the printing data of the respective arrays of printing elements by the second unit on the basis of the registration information and store the printing data in the print buffer.

* * * * *